US011736707B2

(12) United States Patent
Lee

(10) Patent No.: US 11,736,707 B2
(45) Date of Patent: *Aug. 22, 2023

(54) METHOD AND APPARATUS FOR PROCESSING VIDEO SIGNAL USING AFFINE PREDICTION

(71) Applicant: LG ELECTRONICS INC., Seoul (KR)

(72) Inventor: Jaeho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/363,648

(22) Filed: Jun. 30, 2021

(65) Prior Publication Data

US 2021/0329282 A1   Oct. 21, 2021

Related U.S. Application Data

(63) Continuation of application No. 16/636,263, filed as application No. PCT/KR2018/008845 on Aug. 3, 2018, now Pat. No. 11,089,317.

(Continued)

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/159* (2014.11); *H04N 19/176* (2014.11); *H04N 19/46* (2014.11)

(58) Field of Classification Search
CPC .... H04N 19/44; H04N 19/105; H04N 19/159; H04N 19/176; H04N 19/46;
(Continued)

(56) References Cited

U.S. PATENT DOCUMENTS 9,438,910 B1   9/2016 Han et al.
10,462,488 B1 * 10/2019 Li .................. H04N 19/176
(Continued)

FOREIGN PATENT DOCUMENTS

CN          105493505      4/2016
WO      WO 2011013253     2/2011
(Continued)

OTHER PUBLICATIONS

Chen J. et al. Joint Video Exploration Team (JVET) of ITU-T SG 16 WP 3 and ISO/IEC JTC 1/SC 29/WG 11 3rd Meeting: Geneva, CH, May 26-Jun. 1, 2016, Algorithm Description of Joint Exploration Test Model 3 (from IDS dated Feb. 3, 2020) (Year: 2016).*
(Continued)

*Primary Examiner* — Richard A Hansell, Jr.
(74) *Attorney, Agent, or Firm* — Fish & Richardson P.C.

(57) ABSTRACT

The present disclosure provides a method for decoding a video signal including a current block based on an affine motion prediction mode (affine mode, AF mode), the method including: checking whether the AF mode is applied to the current block, the AF mode representing a motion prediction mode using an affine motion model; checking whether an AF4 mode is used when the AF mode is applied to the current block, the AF4 mode representing a mode in which a motion vector is predicted using four parameters constituting the affine motion model; generating a motion vector predictor using the four parameters when the AF4 mode is used and generating a motion vector predictor using six parameters constituting the affine motion model when the AF4 mode is not used; and obtaining a motion vector of the current block based on the motion vector predictor.

8 Claims, 35 Drawing Sheets

Related U.S. Application Data

(60) Provisional application No. 62/541,083, filed on Aug. 3, 2017.

(51) Int. Cl.
  H04N 19/159 (2014.01)
  H04N 19/176 (2014.01)
  H04N 19/46 (2014.01)

(58) Field of Classification Search
  CPC .. H04N 19/174; H04N 19/109; H04N 19/513; H04N 19/54; H04N 19/70; H04N 19/119
  See application file for complete search history.

(56) References Cited

U.S. PATENT DOCUMENTS

| | | | |
|---|---|---|---|
| 10,827,171 B2* | 11/2020 | Li | H04N 19/137 |
| 2010/0329347 A1 | 12/2010 | Kim et al. | |
| 2017/0214932 A1* | 7/2017 | Huang | H04N 19/537 |
| 2017/0332095 A1* | 11/2017 | Zou | H04N 19/124 |
| 2018/0098063 A1* | 4/2018 | Chen | H04N 19/176 |
| 2019/0028731 A1* | 1/2019 | Chuang | H04N 19/159 |
| 2020/0014931 A1* | 1/2020 | Hsiao | H04N 19/517 |
| 2020/0213612 A1* | 7/2020 | Liu | H04N 19/513 |
| 2020/0404282 A1* | 12/2020 | Li | H04N 19/117 |

FOREIGN PATENT DOCUMENTS

| | | | |
|---|---|---|---|
| WO | WO2017087751 | 5/2017 | |
| WO | WO-2017087751 A1 * | 5/2017 | ............ H04N 19/46 |
| WO | WO-2017087751 A1 * | 5/2017 | ............ H04N 19/46 |
| WO | WO2017118409 | 7/2017 | |
| WO | WO2017118411 | 7/2017 | |
| WO | WO 2017130696 | 8/2017 | |

OTHER PUBLICATIONS

Office Action in European Appln. No. 18840631.8, dated Oct. 15, 2021, 5 pages.

Chen et al., "Algorithm Description of Joint Exploration Test Model 3," JVET-C1001 v3, Joint Video Exploration Team (JVET) of ITU-T SG 16 WP 3 and ISO/IEC JTC 1/SC 29/WG 11, 3rd Meeting: Geneva, CH, dated May 26-Jun. 1, 2016, 38 pages.

EP Extended Emopean Search Report in European Appln. No. 18840631.8, dated Mar. 30, 2020, 8 pages.

Li et al., "An Efficient Four-Parameter Affine Motion Model for Video Coding," Submitted to IEEE Transactions on Circuits and Systems for Video Technology, dated Feb. 21, 2017, 15 pages.

Qualcomm Inc., "Improved affine motion prediction," JVET-C0062 v2, Joint Video Exploration Team (JVET) of ITU-T SG 16 WP 3 and ISO/IEC JTC 1/SC 29/WG 11, 3rd Meeting: Geneva, CH, dated May 26-Jun. 1, 2016, 6 pages.

Qualcomm Incorporated, "EE4: Improved affine motion prediction," JVET-D0121, Joint Video Exploration Team (JVET) of ITU-T SG 16 WP 3 and ISO/IEC JTC 1/SC 29/WG 11, Chengdu, CN, dated Oct. 15-21, 2016, 4 pages, XP030150372.

Lee et al., "A unified condition for affine merge and affine inter mode," Joint Video Exploration Team (JVET) of ITU-T SG 16 WP 3 and ISO/IEC JTC 1/SC 29/WG 11, 5th Meeting: Geneva, CH, Jan. 12-20, 2017, 3 pages.

Office Action in Chinese Appln. No. 201880057060.3, dated Mar. 9, 2023, 22 pages (with English translation).

Office Action in Japanese Appln. No. 2020-205788, dated Apr. 18, 2023, 9 pages (with English translation).

Zhao et al., "On Affine Motion Vectors, " Joint Video Exploration Team (JVET) of ITU-T SG 16 WP 3 and ISO/IEC JTC 1/SC 29/WG 11, 4th Meeting: Chengdu, CN, Oct. 15-21, 2016, 4 pages.

* cited by examiner

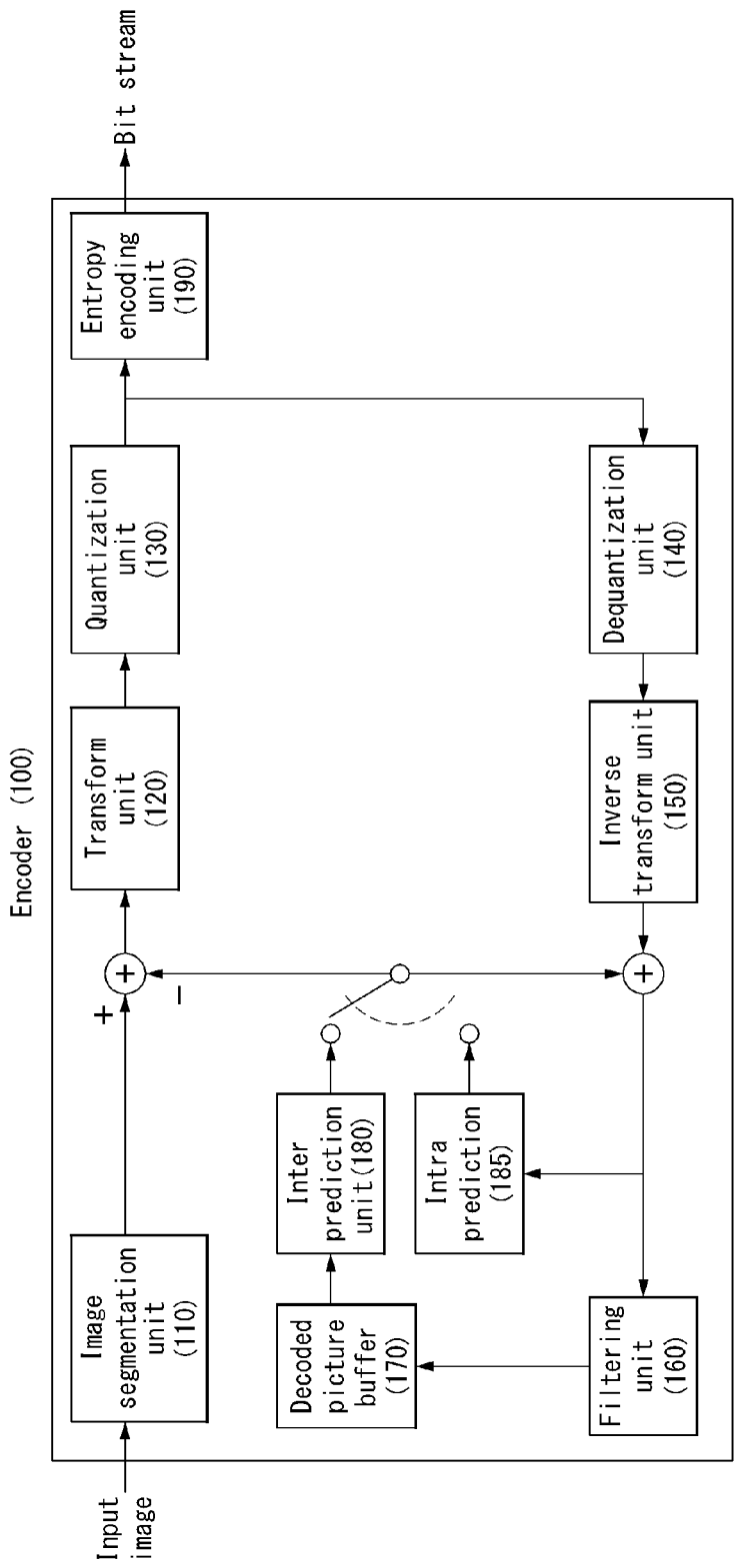
[FIG. 1]

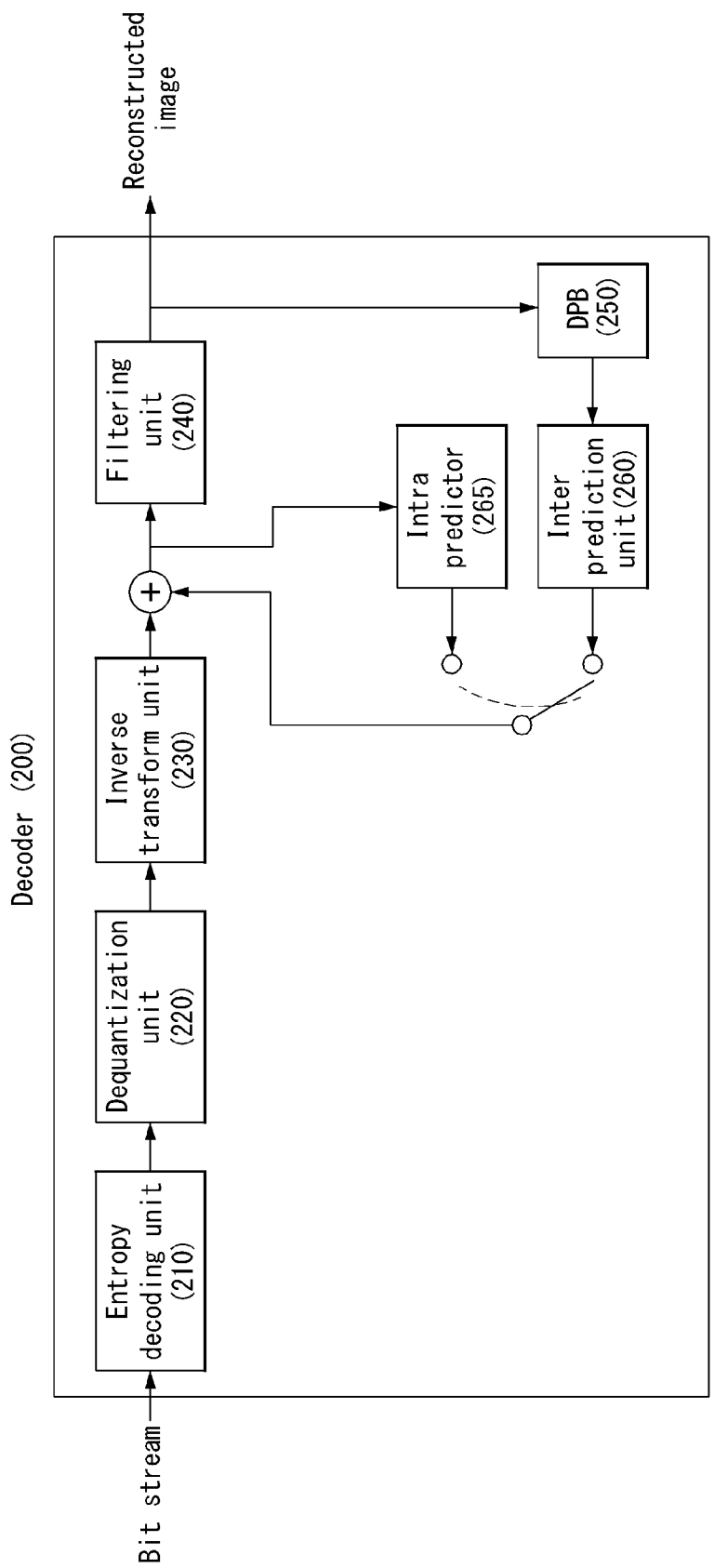
[FIG. 2]

[FIG. 3]
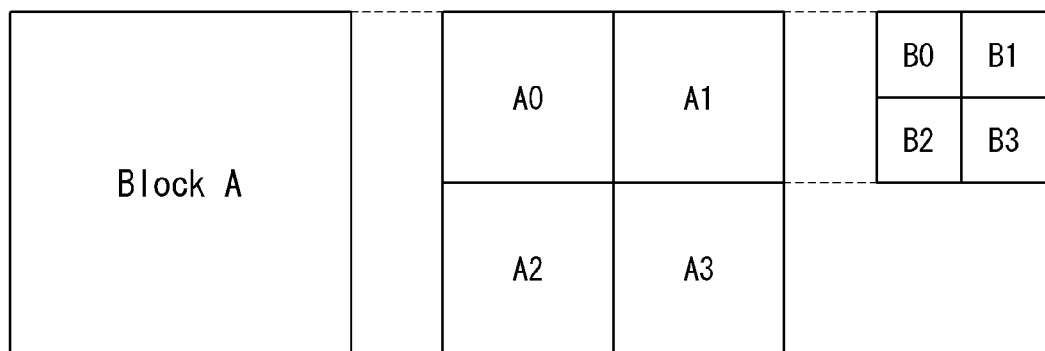

[FIG. 4]
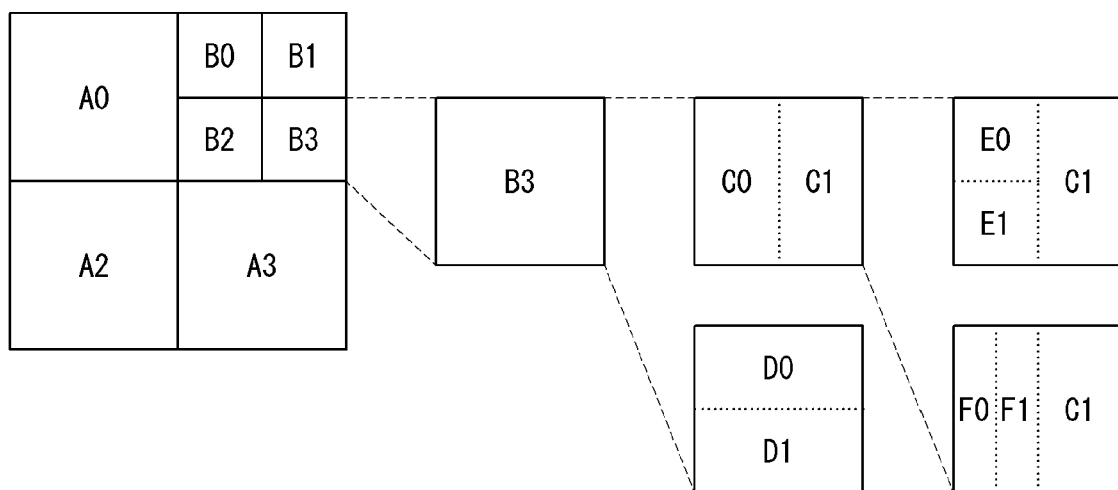

[FIG. 5]
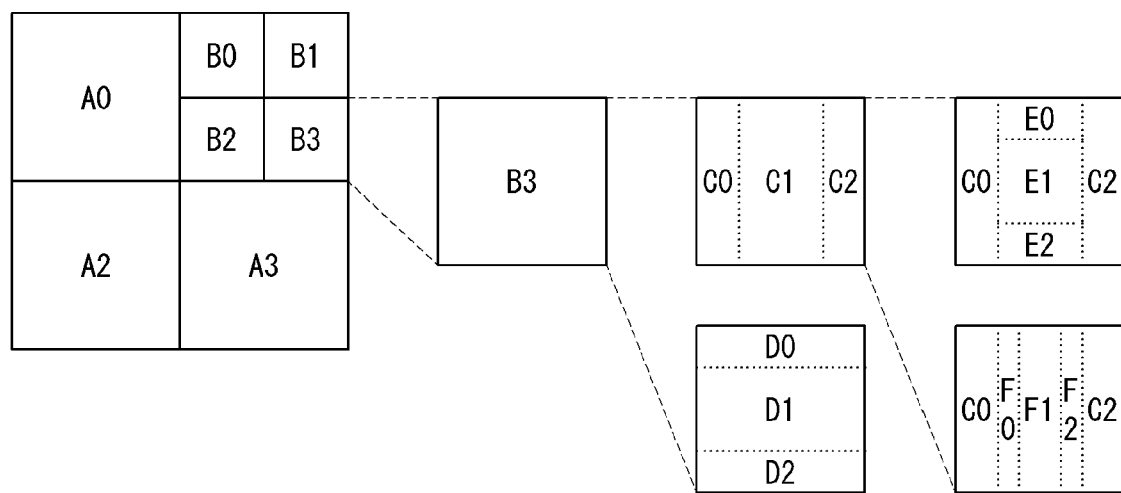

[FIG. 6]
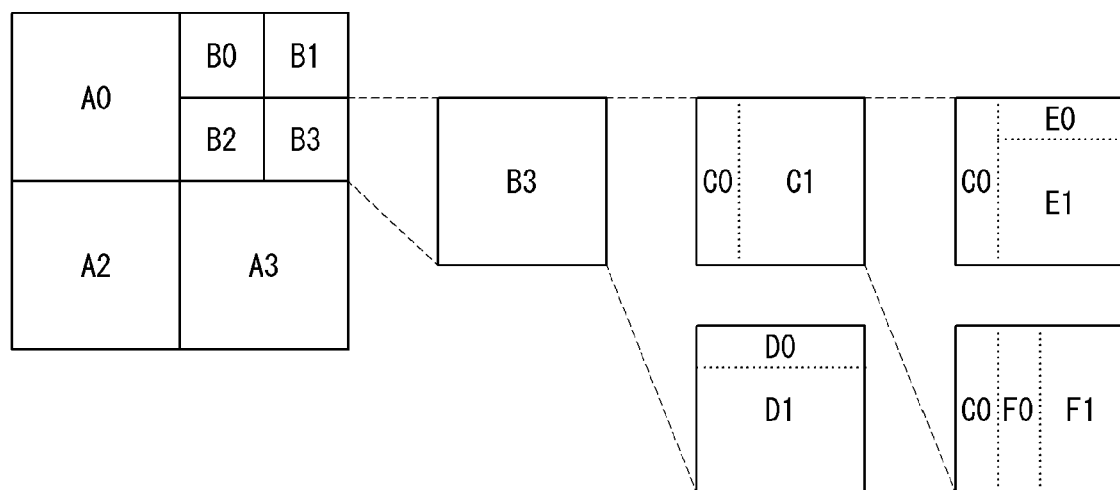

[FIG. 7A]
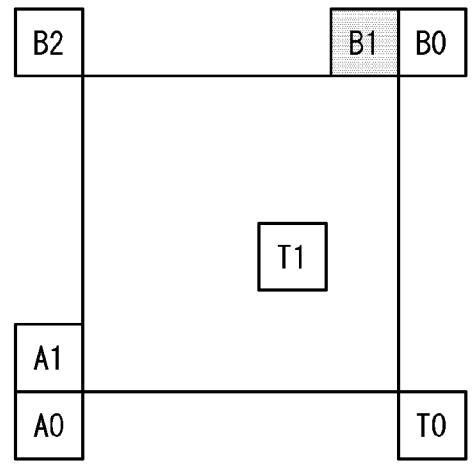
[FIG. 7B]

[FIG. 8]
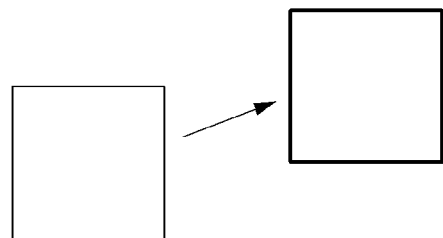
Translate
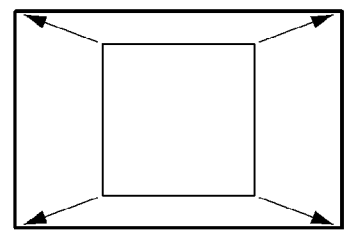
Scale
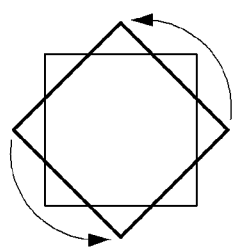
Rotate
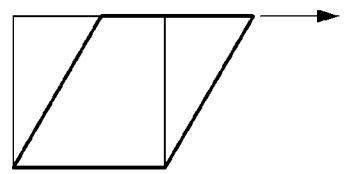
Shear

[FIG. 9A]
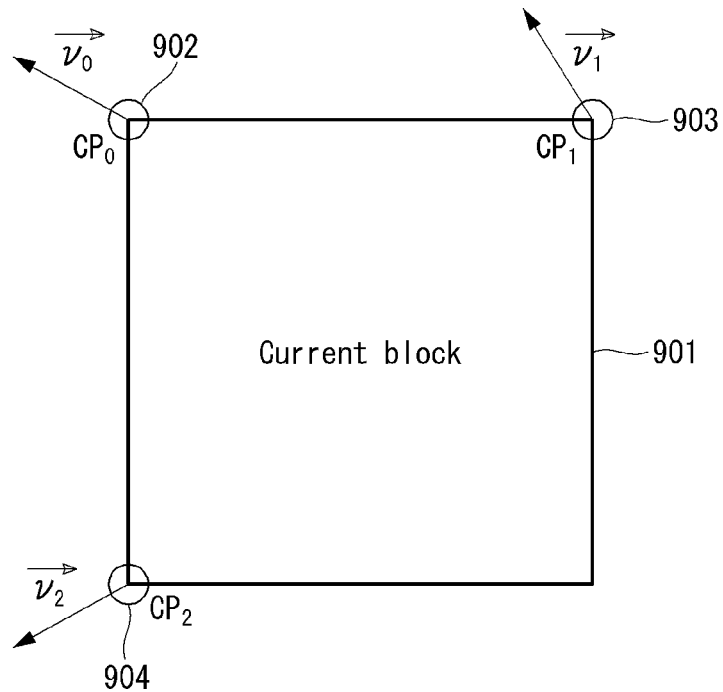
[FIG. 9B]
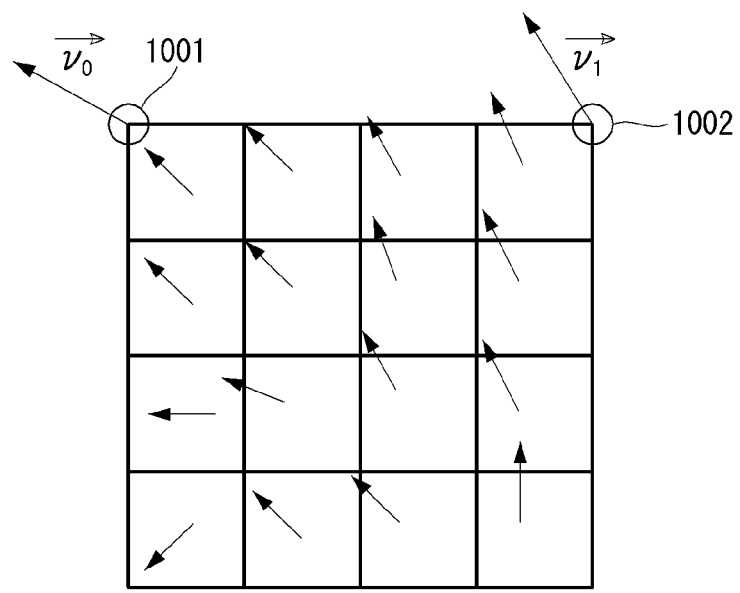

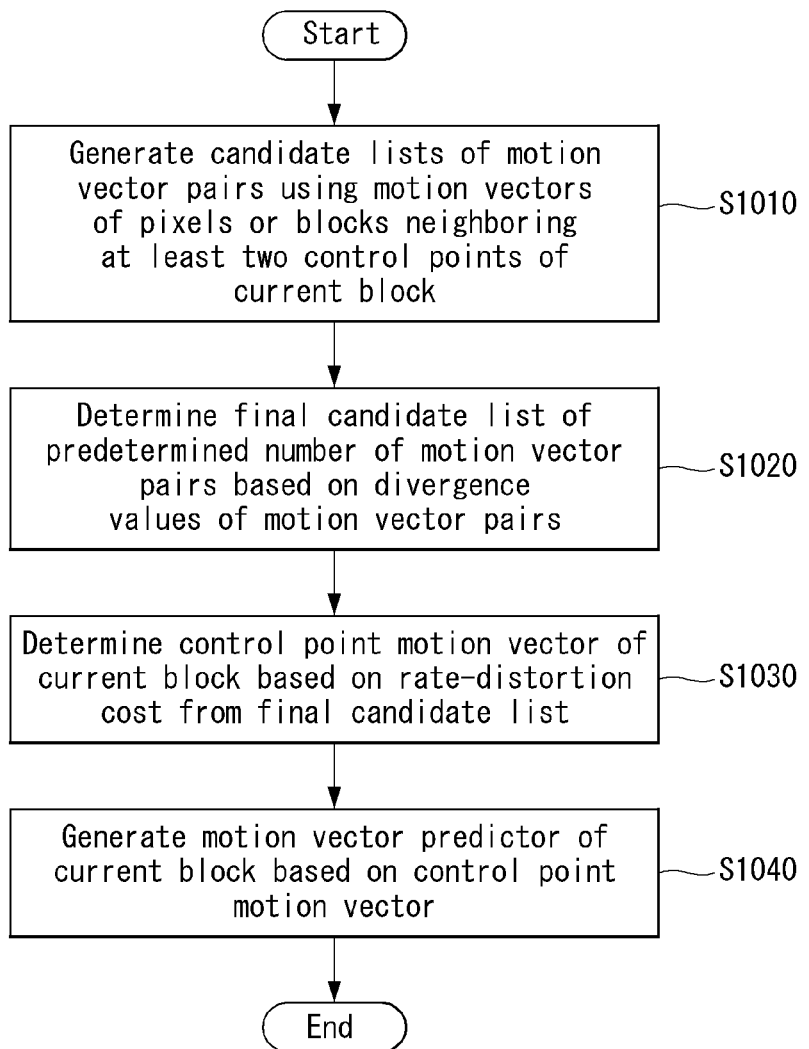
[FIG. 10]

[FIG. 11]
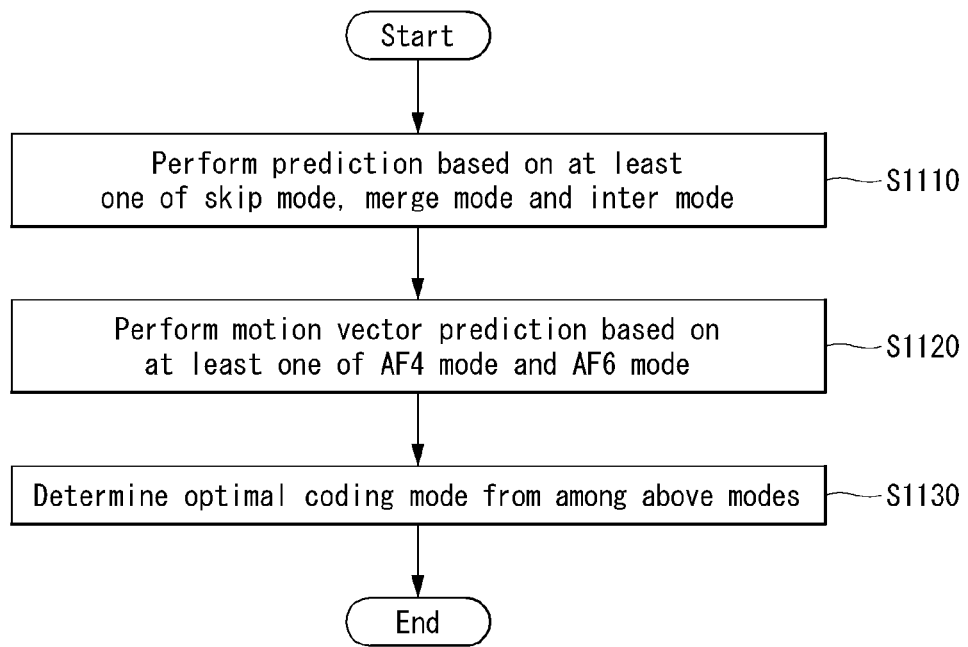

[FIG. 12]
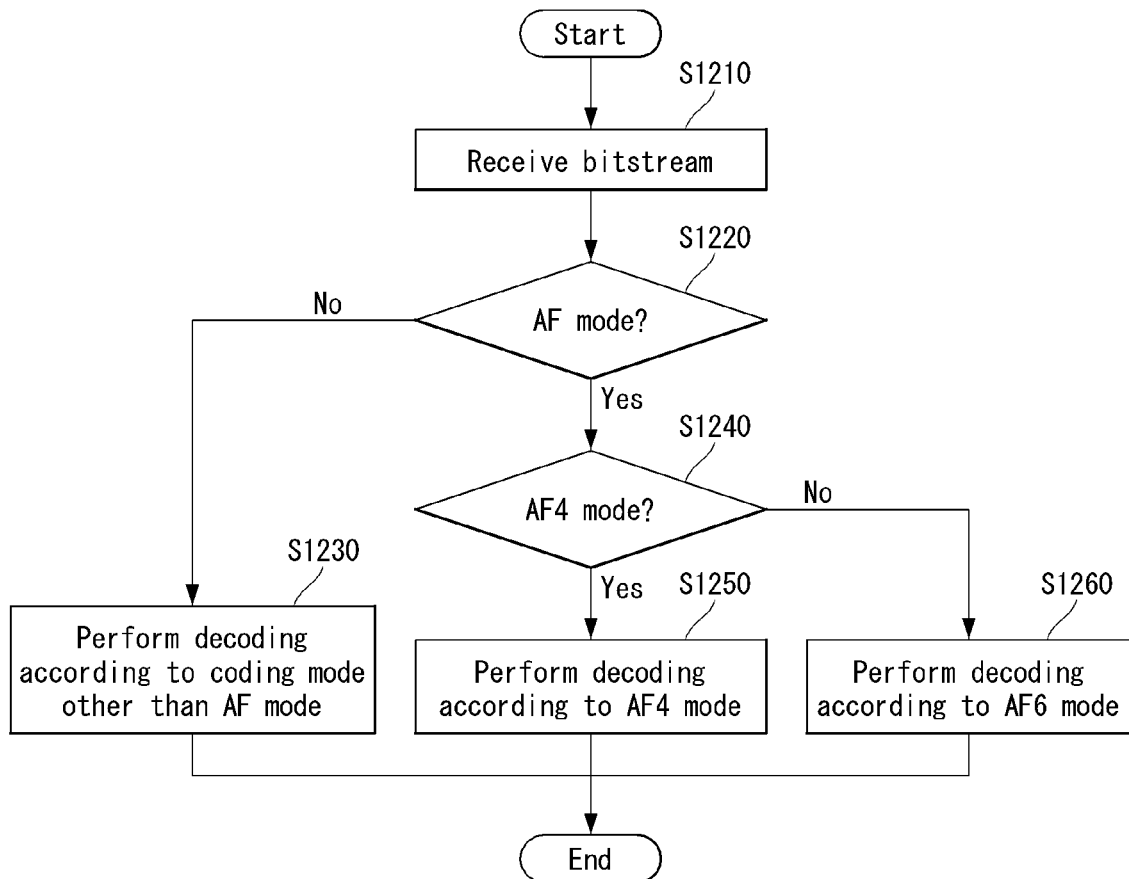

[FIG. 13]

| | |
|---|---|
| (S1310) | `merge_flag` |
| | `if (merge_flag) {` |
| | `  ...` |
| | `}` |
| | `else {` |
| (S1320) | `  affine_flag` |
| | `  if (affine_flag) {` |
| (S1330) | `    affine_param_flag` |
| | `    if (affine_param_flag == 0) {` |
| (S1340) | `      mvd_CP0` |
| | `      mvd_CP1` |
| | `    }` |
| | `    else {` |
| (S1350) | `      mvd_CP0` |
| | `      mvd_CP1` |
| | `      mvd_CP2` |
| | `    }` |
| | `  }` |
| | `}` |

[FIG. 14]
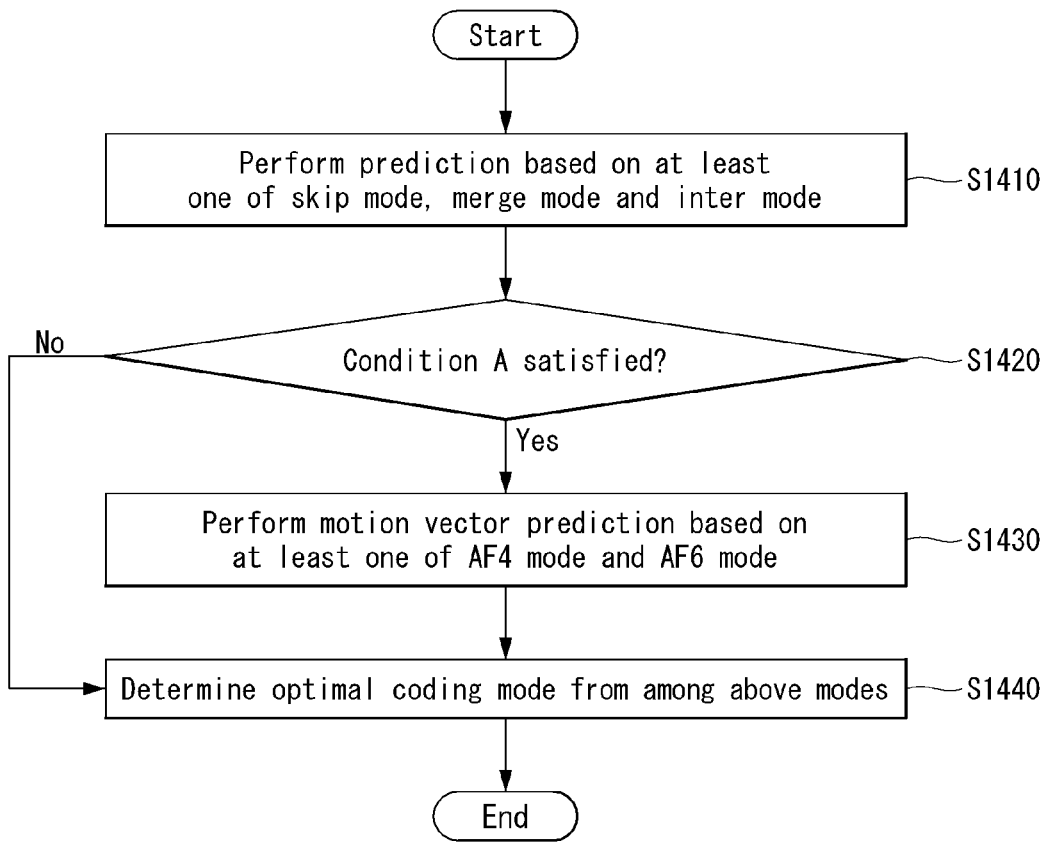

[FIG. 15]
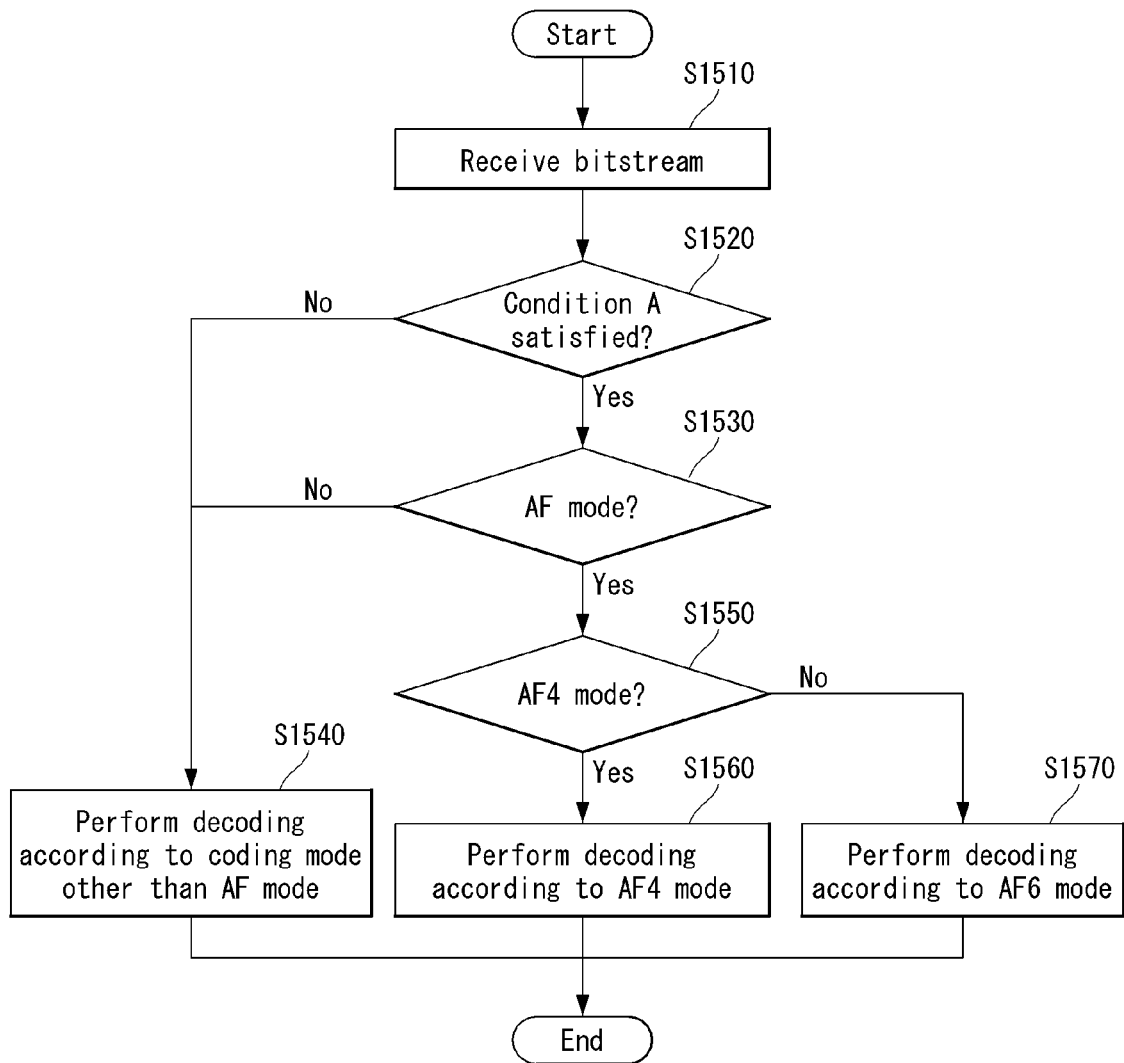

[FIG. 16]

| | |
|---|---|
| (S1610) | `merge_flag`<br>`if (merge_flag) {`<br>`  ...`<br>`}`<br>`else {` |
| (S1620) | `  if (CONDITION A) {`<br>`    affine_flag`<br>`    if (affine_flag) {` |
| (S1630) | `      affine_param_flag`<br>`      if (affine_param_flag == 0) {` |
| (S1640) | `        mvd_CP0`<br>`        mvd_CP1`<br>`      }`<br>`      else {` |
| (S1650) | `        mvd_CP0`<br>`        mvd_CP1`<br>`        mvd_CP2`<br>`      }`<br>`    }`<br>`  }`<br>`}` |

[FIG. 17]
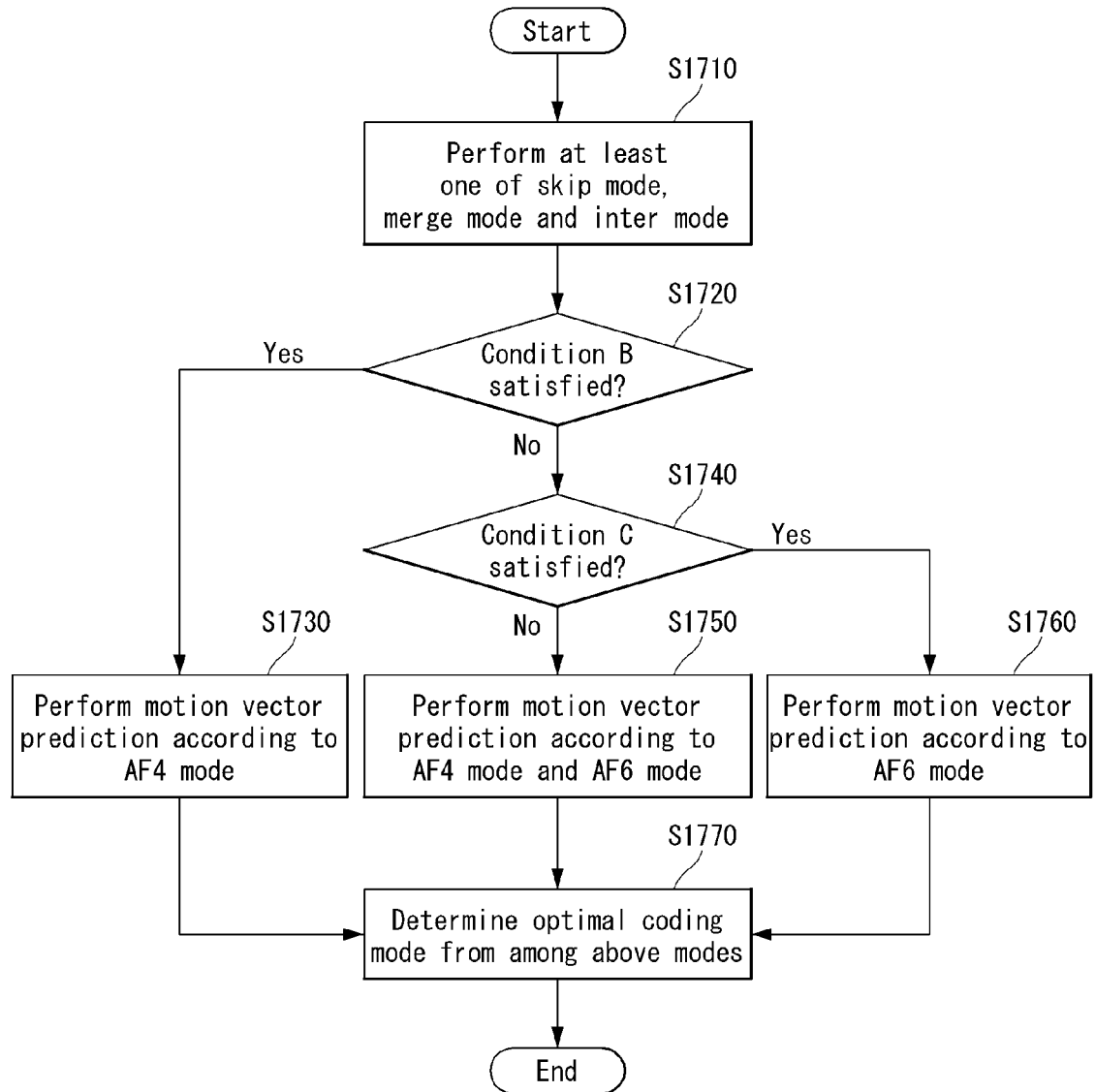

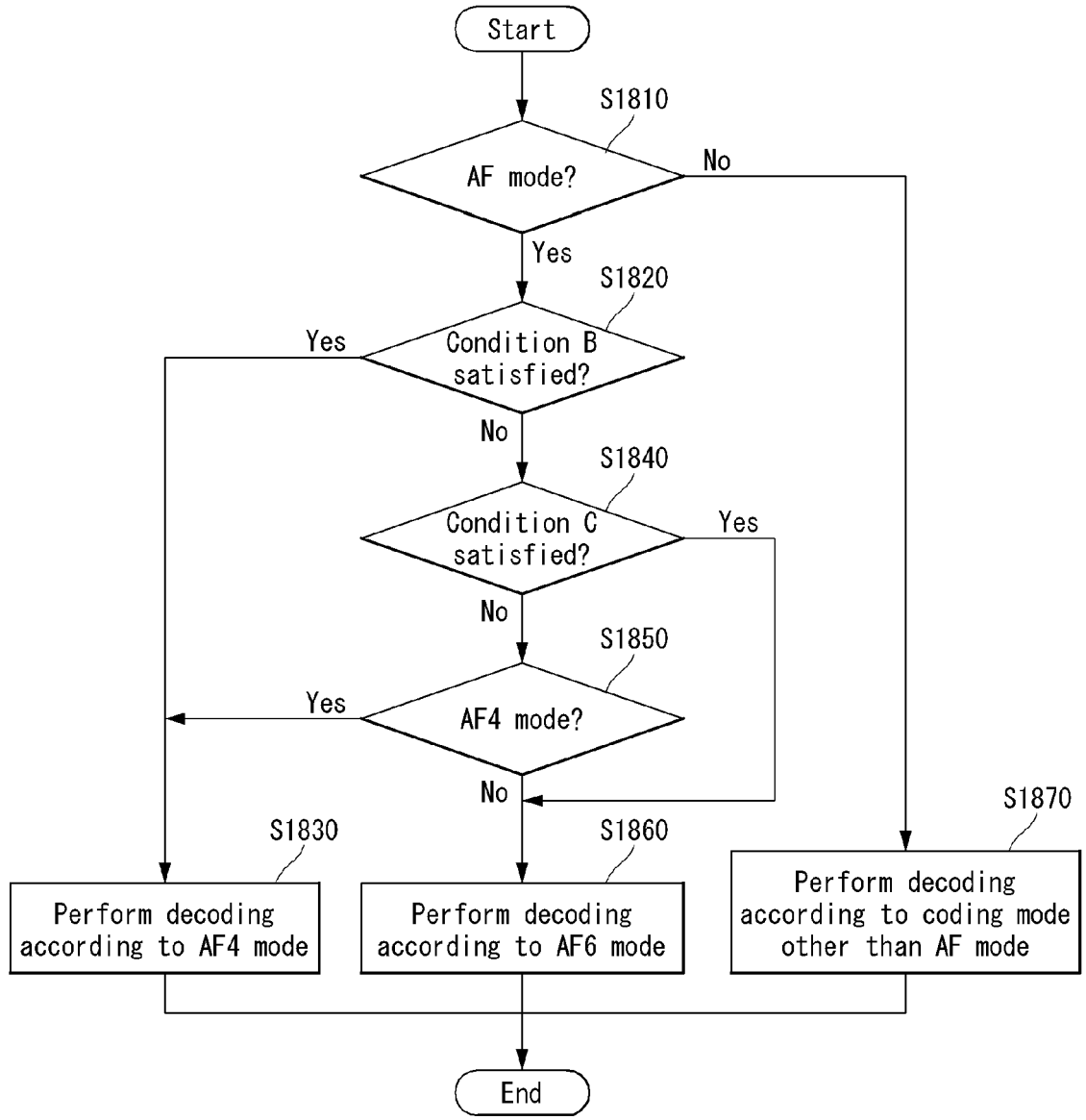
[FIG. 18]

[FIG. 19]

| | |
|---|---|
| (S1910) | `merge_flag`<br>`if (merge_flag) {`<br>`    ...`<br>`}`<br>`else {` |
| (S1920) | `    affine_flag`<br>`    if (affine_flag) {`<br>`        if (CONDITION B)` |
| (S1930) | `            set affine_param_flag as 0`<br>`        else if (CONDITION C)` |
| (S1940) | `            set affine_param_flag as 1`<br>`        else` |
| (S1950) | `            affine_param_flag`<br>`        if (affine_param_flag == 0) {` |
| (S1960) | `            mvd_CP0`<br>`            mvd_CP1`<br>`        }`<br>`        else {` |
| (S1970) | `            mvd_CP0`<br>`            mvd_CP1`<br>`            mvd_CP2`<br>`        }`<br>`    }`<br>`}` |

[FIG. 20]
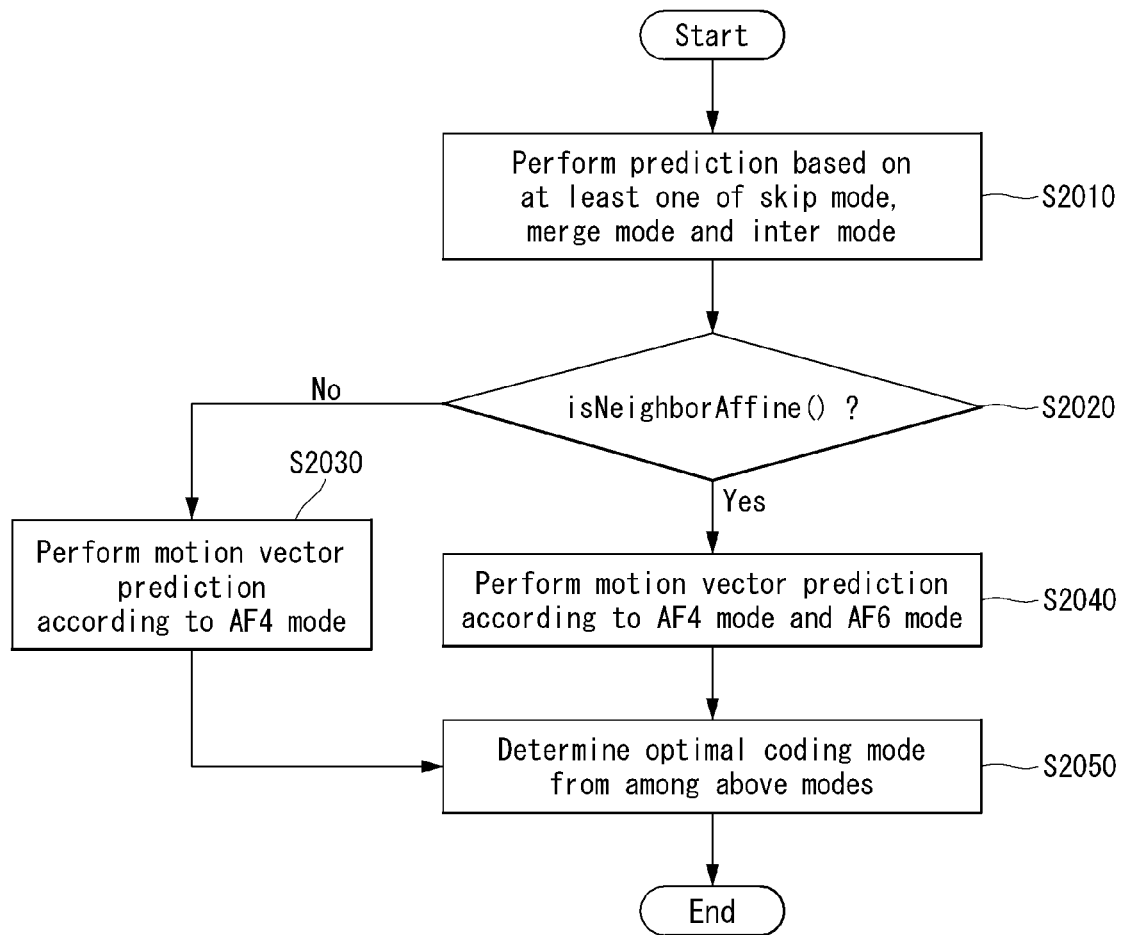

[FIG. 21]
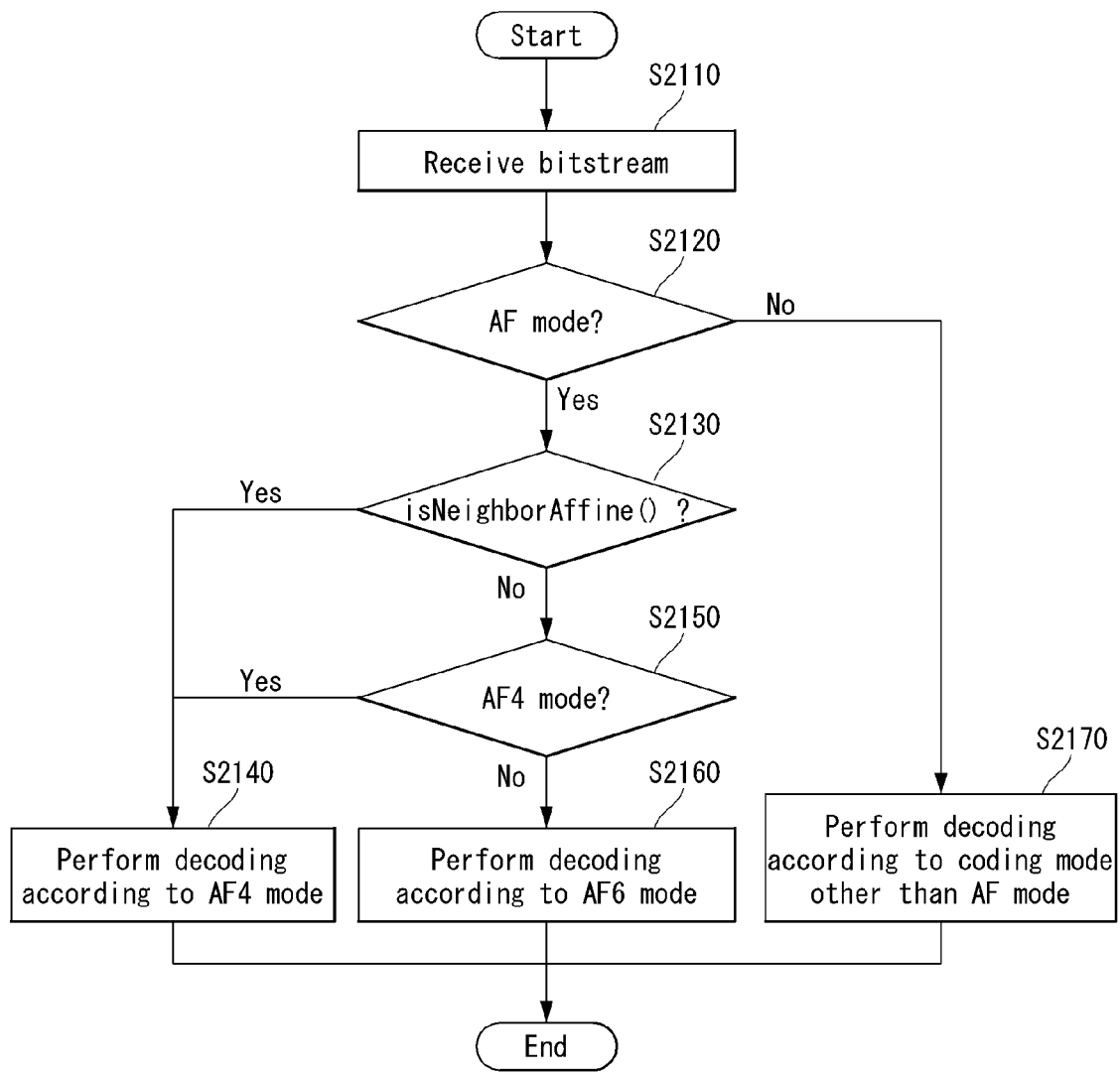

[FIG. 22]

| | |
|---|---|
| (S2210) | `merge_flag` |
| | `if (merge_flag) {` |
| | `    ...` |
| | `}` |
| | `else {` |
| (S2220) | `    affine_flag` |
| | `    if (affine_flag) {` |
| (S2230) | `        if (isNeighborAffine())` |
| | `            affine_param_flag` |
| (S2240) | `        else` |
| | `            set affine_param_flag as 0` |
| | `        if (affine_param_flag == 0) {` |
| (S2250) | `            mvd_CP0` |
| | `            mvd_CP1` |
| | `        }` |
| | `        else {` |
| (S2260) | `            mvd_CP0` |
| | `            mvd_CP1` |
| | `            mvd_CP2` |
| | `        }` |
| | `    }` |
| | `}` |

[FIG. 23]
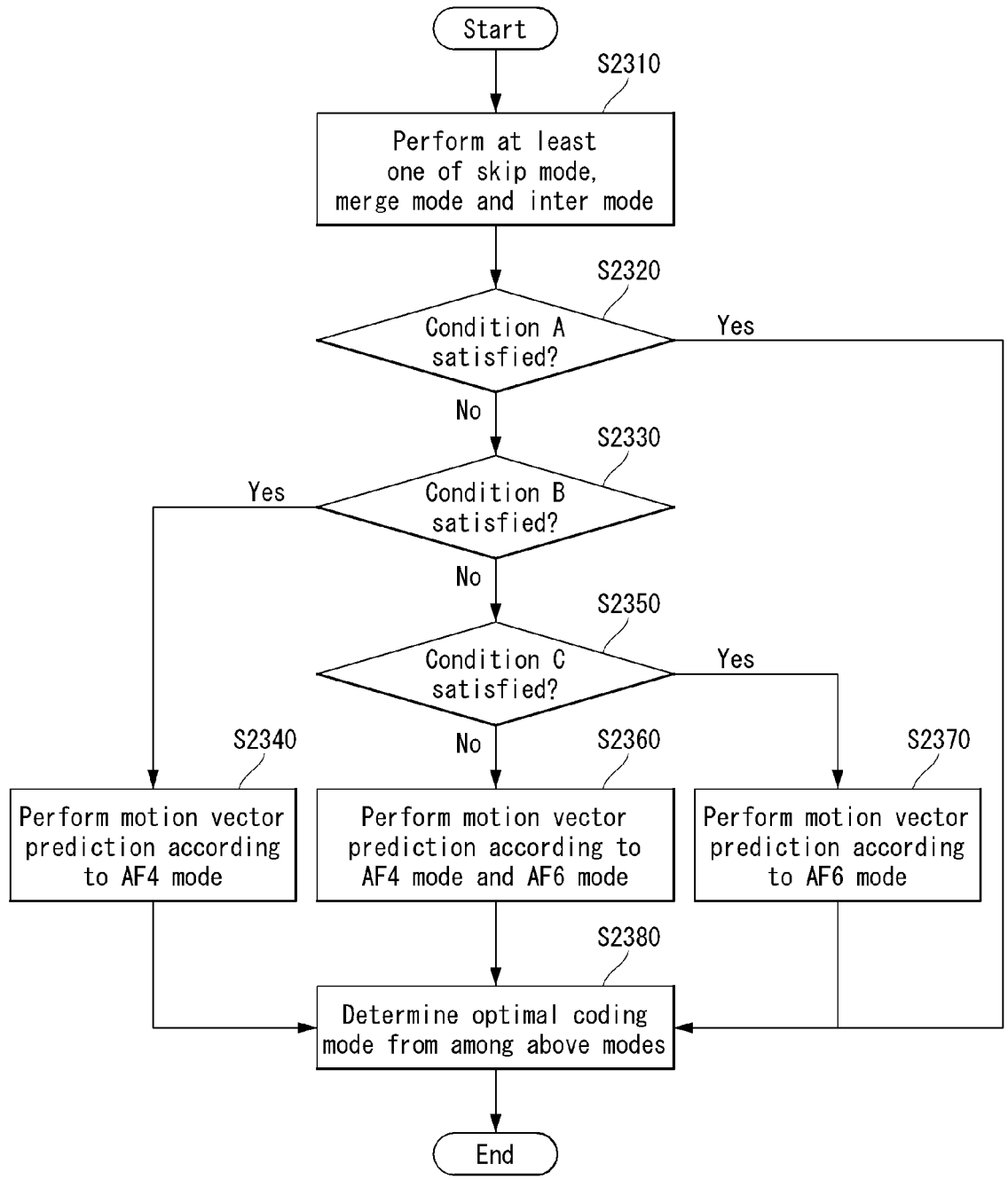

[FIG. 24]
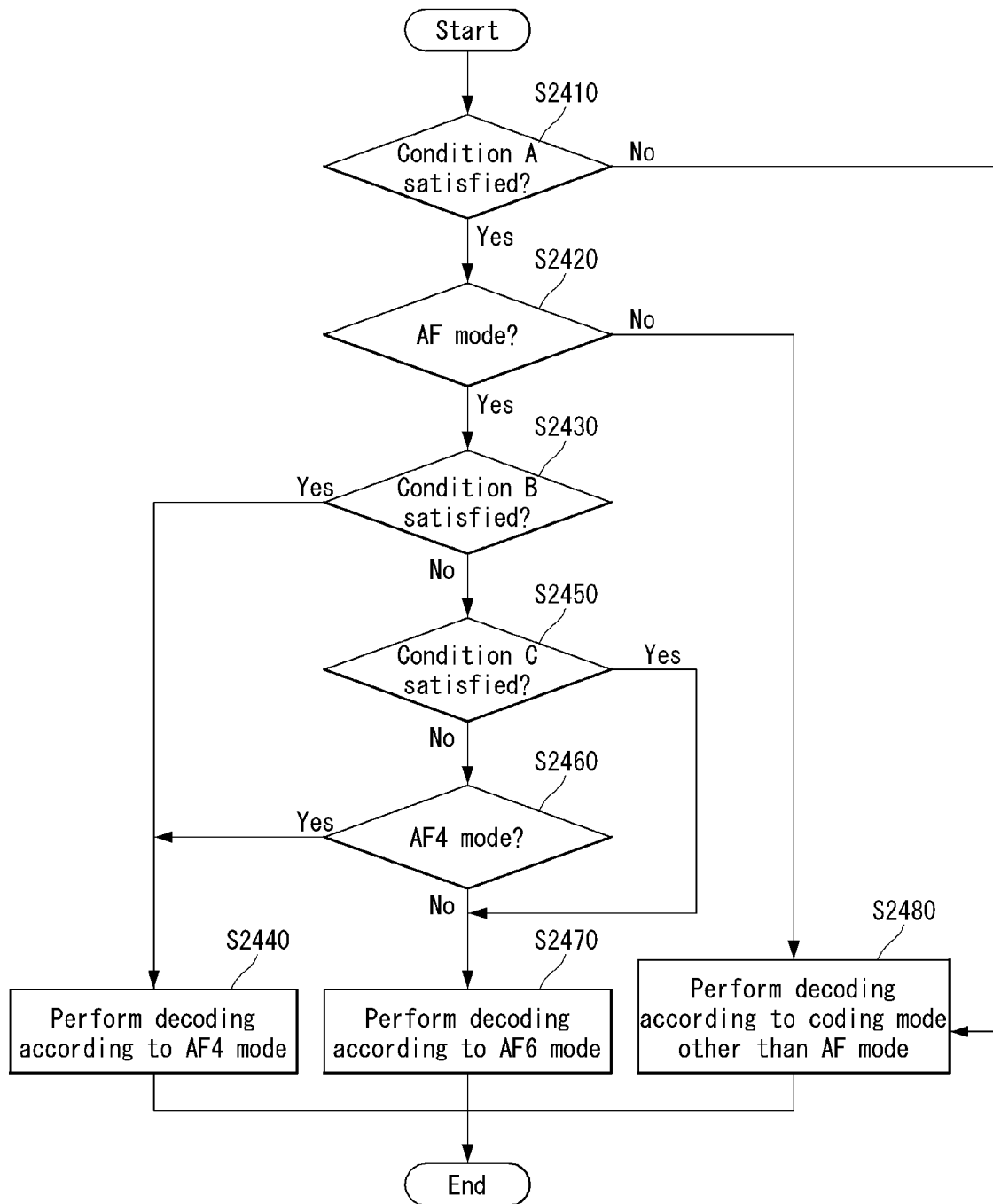

[FIG. 25]

```
(S2510)     merge_flag
            if (merge_flag) {
               ...
            }
            else {
               if (CONDITION A)
(S2520)        affine_flag
(S2530)        if (affine_flag) {
                  if (CONDITION B)
(S2540)           set affine_param_flag as 0
                  else if (CONDITION C)
(S2550)           set affine_param_flag as 1
                  else
(S2560)           affine_param_flag
                  if (affine_param_flag == 0) {
(S2570)              mvd_CP0
                     mvd_CP1
                  }
                  else {
(S2580)              mvd_CP0
                     mvd_CP1
                     mvd_CP2
                  }
               }
            }
```

[FIG. 26]
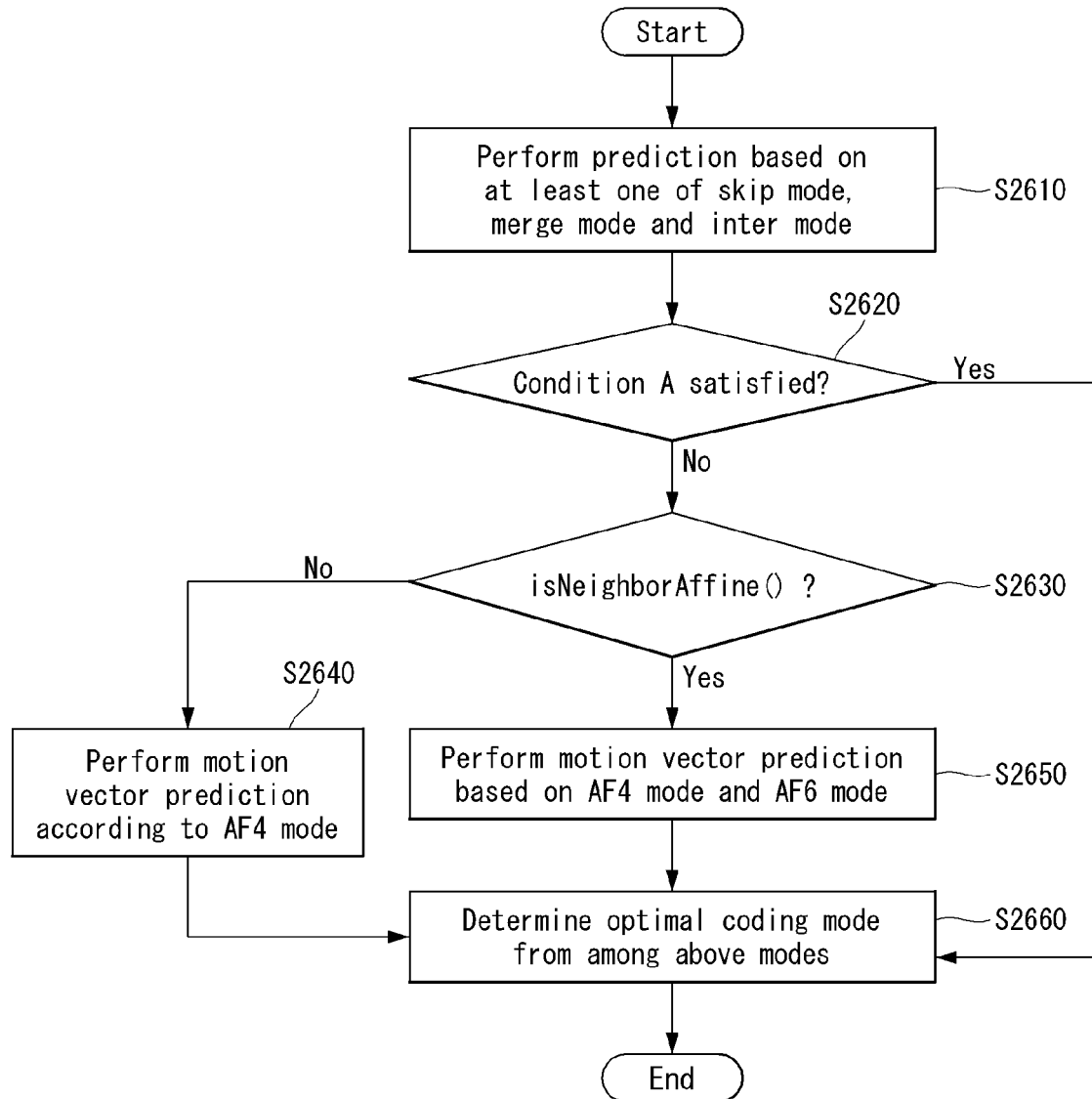

[FIG. 27]
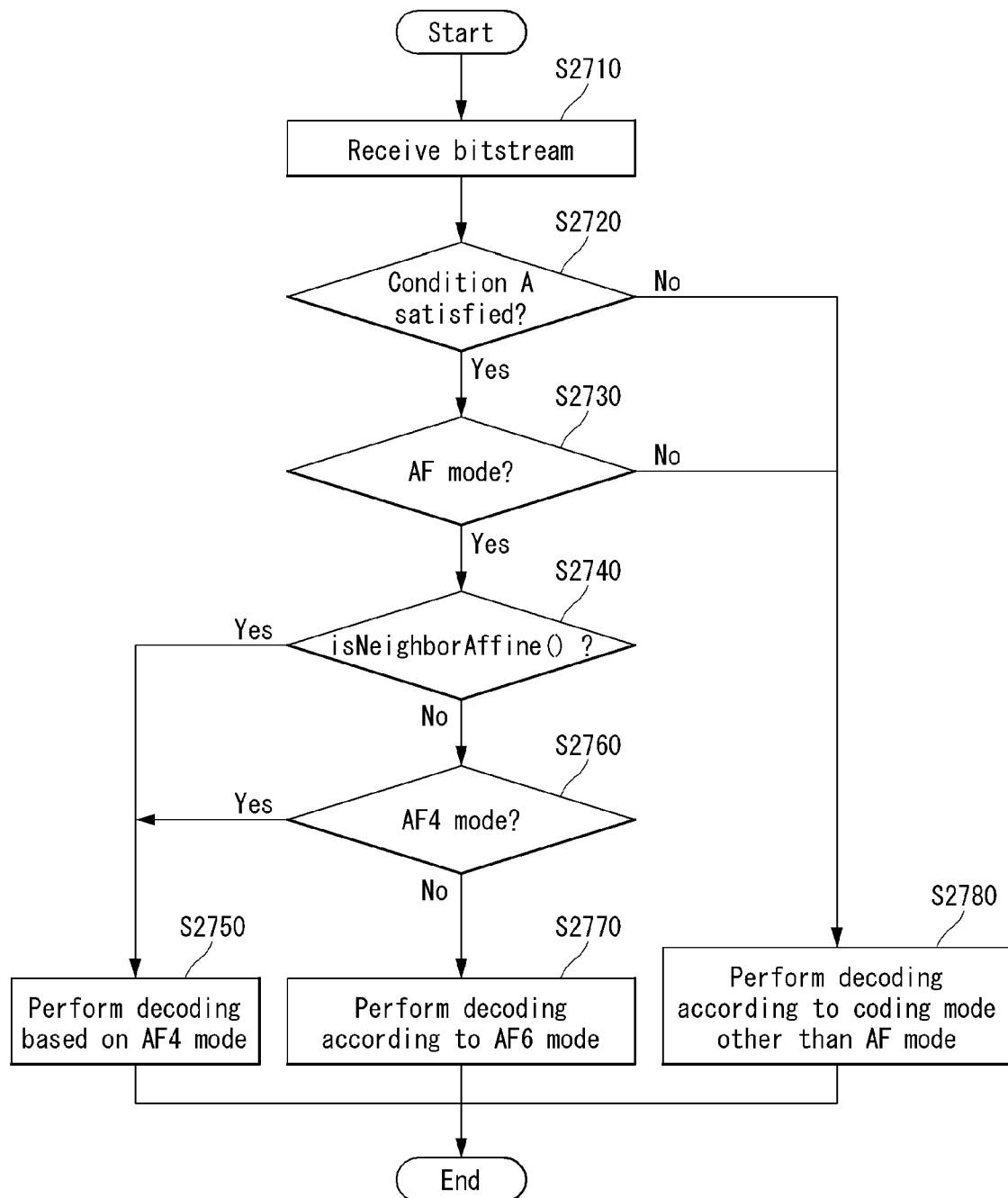

[FIG. 28]

| | |
|---|---|
| (S2810) | `merge_flag` |
| | `if (merge_flag) {` |
| | `  ...` |
| | `}` |
| | `else {` |
| | `  if (CONDITION A)` |
| (S2820) | `    affine_flag` |
| | `    if (affine_flag) {` |
| (S2830) | `      if (isNeighborAffine())` |
| | `        affine_param_flag` |
| (S2840) | `      else` |
| | `        set affine_param_flag as 0` |
| | `      if (affine_param_flag == 0) {` |
| (S2850) | `        mvd_CP0` |
| | `        mvd_CP1` |
| | `      }` |
| | `      else {` |
| (S2860) | `        mvd_CP0` |
| | `        mvd_CP1` |
| | `        mvd_CP2` |
| | `      }` |
| | `    }` |
| | `}` |

[FIG. 29]
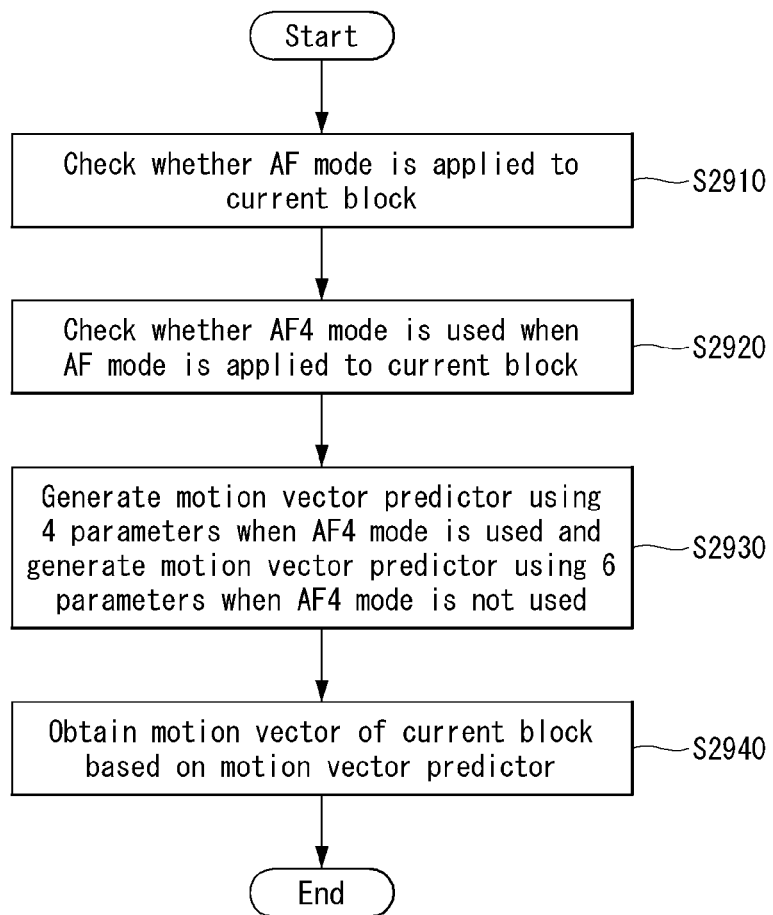

[FIG. 30]
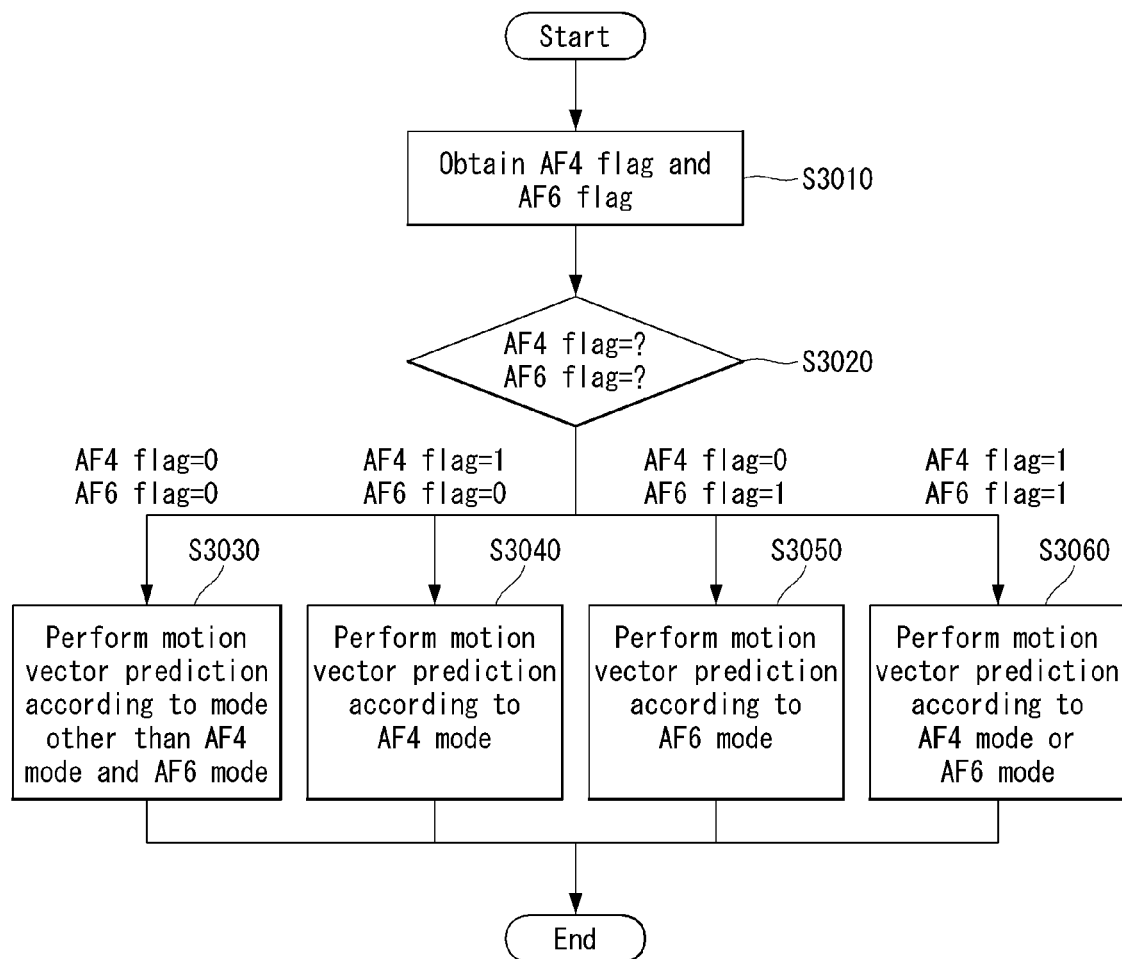

[FIG. 31]
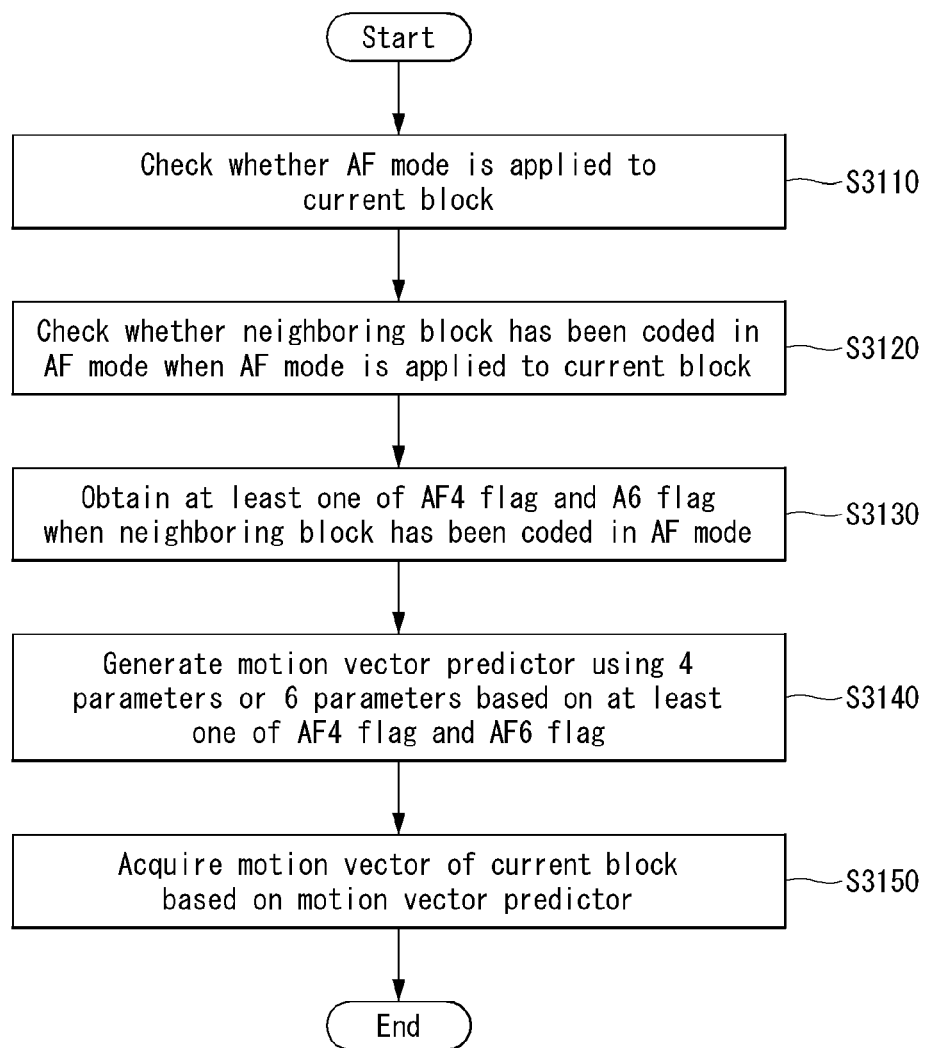

[FIG. 32]

| (S3210) | Slice<br>...<br>affine_4_flag<br>affine_6_flag |
|---|---|
| (S3220)<br><br>(S3230)<br><br>(S3240)<br><br>(S3250) | parse merge_flag<br>if (merge_flag) {<br>...<br>}<br>else { // inter<br>  if (affine_4_flag != 0 \|\| affine_6_flag != 0) { //<br>  NOT (affine_4_flag == 0 && affine_6_flag == 0)<br>    parse affine_flag<br>      if (affine_flag) {<br>        if (affine_4_flag == 1 && affine_6_flag == 0)<br>          set affine_param_flag as 0 // AF4<br>        else if (affine_4_flag == 0 && affine_6_flag == 1)<br>          set affine_param_flag as 1 // AF6<br>        else if (affine_4_flag == 1 && affine_6_flag == 1)<br>          parse affine_param_flag<br>        if (parse affine_param_flag == 0) { // AF4<br>        parse mvd for CP0<br>        parse mvd for CP1<br>      }<br>      else { // if (parse affine_param_flag == 1) // AF6<br>        parse mvd for CP0<br>        parse mvd for CP1<br>        parse mvd for CP2<br>        }<br>      }<br>    }<br>} |

[FIG. 33]

| | |
|---|---|
| | Slice<br>affine_4_flag<br>affine_6_flag |
| (S3310)<br><br>(S3320) | parse merge_flag<br>if (merge_flag) {<br>...<br>}<br>else { // inter<br>  if (affine_4_flag != 0 \|\| affine_6_flag != 0) { //<br>  NOT (affine_4_flag == 0 && affine_6_flag == 0)<br>    parse affine_flag<br>      if (affine_flag) {<br>        if (affine_4_flag == 1 && affine_6_flag == 0)<br>          set affine_param_flag as 0 // AF4<br>        else if (affine_4_flag == 0 && affine_6_flag == 1)<br>          set affine_param_flag as 1 // AF6<br>        else if (affine_4_flag == 1 && affine_6_flag == 1)<br>          if (isNeighborAffine())<br>            parse affine_param_flag<br>          else<br>            set affine_param_flag as 0 // AF4<br>        if (parse affine_param_flag == 0) { // AF4<br>        parse mvd for CP0<br>        parse mvd for CP1<br>      }<br>      else { // if (parse affine_param_flag == 1) // AF6<br>      parse mvd for CP0<br>      parse mvd for CP1<br>      parse mvd for CP2<br>      }<br>    }<br>  }<br>} |

[FIG. 34]
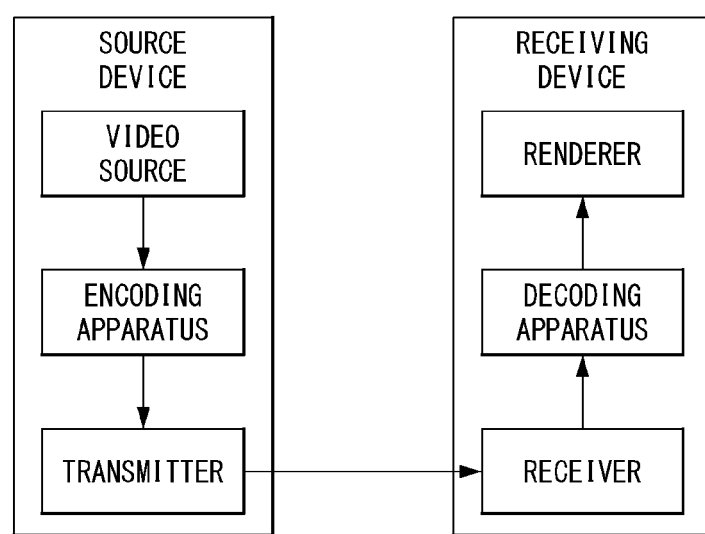

[FIG. 35]
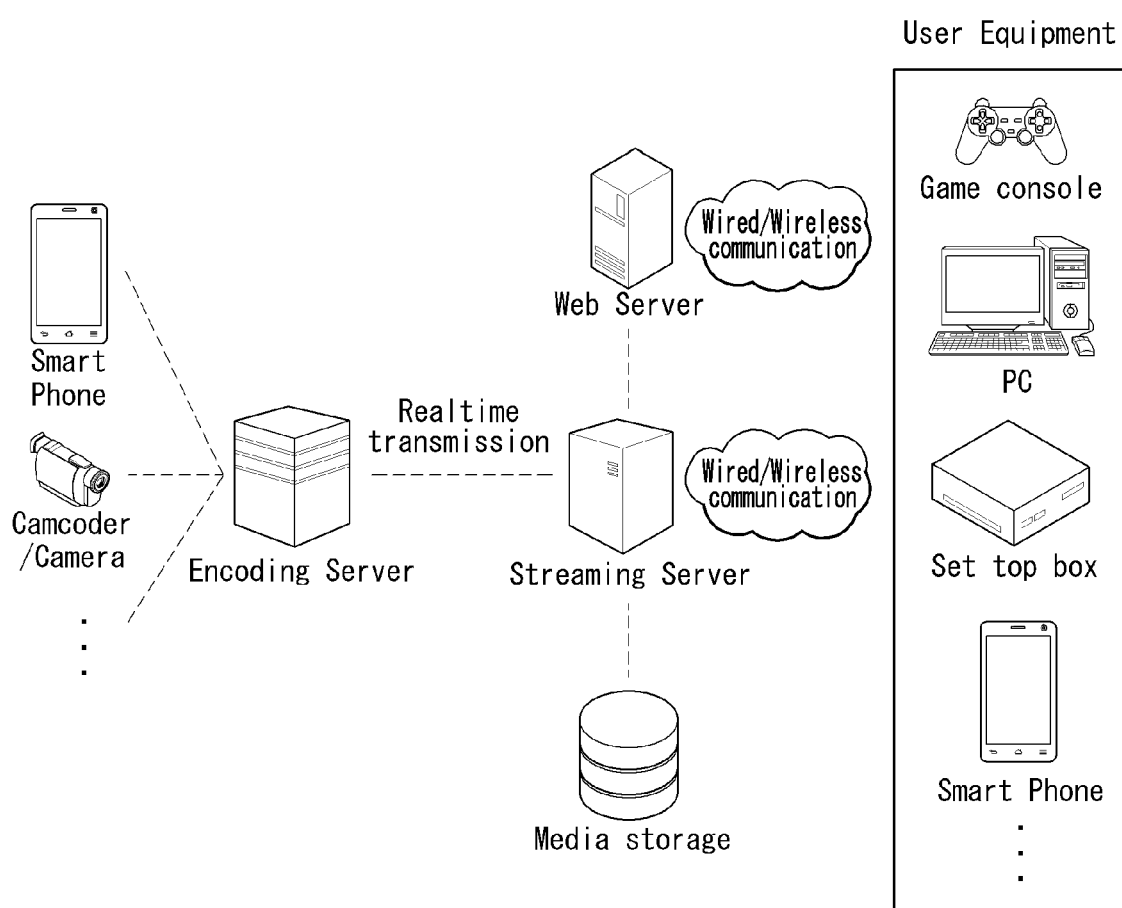

METHOD AND APPARATUS FOR PROCESSING VIDEO SIGNAL USING AFFINE PREDICTION

CROSS-REFERENCE TO RELATED APPLICATIONS

This application is a continuation of U.S. application Ser. No. 16/636,263, filed on Feb. 3, 2020, which is the National Stage filing under 35 U.S.C. 371 of International Application No. PCT/KR2018/008845, filed on Aug. 3, 2018, which claims the benefit of U.S. Provisional Application No. 62/541,083, filed on Aug. 3, 2017, the contents of which are all hereby incorporated by reference herein in their entirety.

TECHNICAL FIELD

The present disclosure relates to a method and apparatus for encoding/decoding a video signal and, more specifically, to a method and apparatus for adaptively performing affine prediction.

BACKGROUND ART

Compression encoding means a series of signal processing technology for transmitting digitalized information through a communication line or for storing digitalized information in a form appropriate to a storage medium. Media such video, an image, and a voice may be a target of compression encoding, particularly, technology that performs compression encoding using video as a target is referred to as video compression.

Next generation video contents will have a characteristic of a high spatial resolution, a high frame rate, and high dimensionality of scene representation. In order to process such contents, memory storage, memory access rate, and processing power technologies will remarkably increase.

Therefore, it is necessary to design a coding tool for more efficiently processing next generation video contents.

SUMMARY

The present disclosure proposes a method for encoding and decoding a video signal more efficiently.

In addition, the present disclosure proposes a method for performing encoding or decoding in consideration of both an AF4 mode that is an affine prediction using four parameters and an AF6 mode that is an affine prediction mode using six parameters.

Furthermore, the present disclosure proposes a method for adaptively determining (or selecting) an optimal coding mode according to at least one of the AF4 mode and the AF6 mode based on a block size.

Furthermore, the present disclosure proposes a method for adaptively determining (or selecting) an optimal coding mode according to at least one of the AF4 mode and the AF6 mode based on whether a neighbor block has been coded according to affine prediction.

Technical Solution

To solve the aforementioned technical problems, the present disclosure provides a method for adaptively performing affine prediction based on a block size.

Furthermore, the present disclosure provides a method for adaptively performing affine prediction based on whether a neighbor block has been coded according to affine prediction.

Furthermore, the present disclosure provides a method for adaptively determining (or selecting) an optimal coding mode based on at least one of the AF4 mode and the AF6 mode.

Furthermore, the present disclosure provides a method for adaptively performing affine prediction based on whether at least one predetermined condition is satisfied. In this case, the predetermined condition may include at least one of a block size, the number of pixels of a block, a block width, a block height, and whether a neighbor block has been coded according to affine prediction.

The present disclosure can improve the performance of affine prediction by providing a method for adaptively performing affine prediction and perform more efficient coding by reducing complexity of affine prediction.

DESCRIPTION OF DRAWINGS

FIG. 1 is a block diagram illustrating a configuration of an encoder for encoding a video signal according to an embodiment of the present disclosure.

FIG. 2 is a block diagram illustrating a configuration of a decoder for decoding a video signal according to an embodiment of the present disclosure.

FIG. 3 is a diagram for explaining a QT (QuadTree, referred to as 'QT' hereinafter) block segmentation structure as an embodiment to which the present disclosure is applicable.

FIG. 4 is a diagram for explaining a BT (Binary Tree, referred to as 'BT' hereinafter) block segmentation structure as an embodiment to which the present disclosure is applicable.

FIG. 5 is a diagram for explaining a TT (Ternary Tree, referred to as 'TT' hereinafter) block segmentation structure as an embodiment to which the present disclosure is applicable.

FIG. 6 is a diagram for explaining an AT (Asymmetric Tree, referred to as 'AT' hereinafter) block segmentation structure as an embodiment to which the present disclosure is applicable.

FIGS. 7A and 7B are diagrams for explaining an inter-prediction mode as an embodiment to which the present disclosure is applied.

FIG. 8 is a diagram for explaining an affine motion model as an embodiment to which the present disclosure is applied.

FIGS. 9A and 9B are diagrams for explaining an affine motion prediction method using a control point motion vector as an embodiment to which the present disclosure is applied.

FIG. 10 is a flowchart illustrating a process of processing a video signal including a current block using an affine prediction mode as an embodiment to which the present disclosure is applied.

FIG. 11 is a flowchart illustrating a process of adaptively determining an optimal coding mode based on at least one of an AF4 mode and an AF6 mode as an embodiment (1-1) to which the present disclosure is applied.

FIG. 12 is a flowchart illustrating a process of adaptively performing decoding based on the AF4 mode or the AF6 mode as an embodiment (1-2) to which the present disclosure is applied.

FIG. 13 illustrates a syntax structure in which decoding is performed based on the AF4 mode or the AF6 mode as an embodiment (1-3) to which the present disclosure is applied.

FIG. 14 is a flowchart illustrating a process of adaptively determining an optimal coding mode from among motion vector prediction modes including the AF4 mode or the AF6 mode based on condition A as an embodiment (2-1) to which the present disclosure is applied.

FIG. 15 is a flowchart illustrating a process of adaptively performing decoding according to AF4 mode or the AF6 mode based on condition A as an embodiment (2-2) to which the present disclosure is applied.

FIG. 16 illustrates a syntax structure in which decoding is performed according to the AF4 mode or the AF6 mode based on condition A as an embodiment (2-3) to which the present disclosure is applied.

FIG. 17 is a flowchart illustrating a process of adaptively determining an optimal coding mode from among motion vector prediction modes including the AF4 mode or the AF6 mode based on at least one of condition B and condition C as an embodiment (3-1) to which the present disclosure is applied.

FIG. 18 is a flowchart illustrating a process of adaptively performing decoding according to the AF4 mode or the AF6 mode based on at least one of condition B and condition C as an embodiment (3-2) to which the present disclosure is applied.

FIG. 19 illustrates a syntax structure in which decoding is performed according to the AF4 mode or the AF6 mode based on at least one of condition B and condition C as an embodiment (3-3) to which the present disclosure is applied.

FIG. 20 is a flowchart illustrating a process of adaptively determining an optimal coding mode from among motion vector prediction modes including the AF4 mode or the AF6 mode based on a coding mode of a neighbor block as an embodiment (4-1) to which the present disclosure is applied.

FIG. 21 is a flowchart illustrating a process of adaptively performing decoding according to the AF4 mode or the AF6 mode based on a coding mode of a neighbor block as an embodiment (4-2) to which the present disclosure is applied.

FIG. 22 illustrates a syntax structure in which decoding is performed according to the AF4 mode or the AF6 mode based on a coding mode of a neighbor block as an embodiment (4-3) to which the present disclosure is applied.

FIG. 23 is a flowchart illustrating a process of adaptively determining an optimal coding mode from among motion vector prediction modes including the AF4 mode or the AF6 mode based on at least one of condition A, condition B and condition C as an embodiment (5-1) to which the present disclosure is applied.

FIG. 24 is a flowchart illustrating a process of adaptively performing decoding according to the AF4 mode or the AF6 mode based on at least one of condition A, condition B and condition C as an embodiment (5-2) to which the present disclosure is applied.

FIG. 25 illustrates a syntax structure in which decoding is performed according to the AF4 mode or the AF6 mode based on at least one of condition A, condition B and condition C as an embodiment (5-3) to which the present disclosure is applied.

FIG. 26 is a flowchart illustrating a process of adaptively determining an optimal coding mode from among motion vector prediction modes including the AF4 mode or the AF6 mode based on at least one of condition A and a coding mode of a neighbor block as an embodiment (6-1) to which the present disclosure is applied.

FIG. 27 is a flowchart illustrating a process of adaptively performing decoding according to the AF4 mode or the AF6 mode based on at least one of condition A and a coding mode of a neighbor block as an embodiment (6-2) to which the present disclosure is applied.

FIG. 28 illustrates a syntax structure in which decoding is performed according to the AF4 mode or the AF6 mode based on at least one of condition A and a coding mode of a neighbor block as an embodiment (6-3) to which the present disclosure is applied.

FIG. 29 is a flowchart illustrating a process of generating a motion vector predictor based on at least one of the AF4 mode and the AF6 mode as an embodiment to which the present disclosure is applied.

FIG. 30 is a flowchart illustrating a process of generating a motion vector predictor based on an AF4_flag and an AF6_flag as an embodiment to which the present disclosure is applied.

FIG. 31 is a flowchart illustrating a process of adaptively performing decoding according to the AF4 mode or the AF6 mode based on whether a neighbor block has been coded in an AF mode as an embodiment to which the present disclosure is applied.

FIG. 32 illustrates a syntax in which decoding is adaptively performed based on the AF4_flag and the AF6_flag as an embodiment to which the present disclosure is applied.

FIG. 33 illustrates a syntax in which decoding is adaptively performed according to the AF4 mode or the AF6 mode based on whether a neighbor block has been coded in an AF mode an embodiment to which the present disclosure is applied.

FIG. 34 illustrates a video coding system to which the present disclosure is applied.

FIG. 35 illustrates a content streaming system to which the present disclosure is applied.

BEST MODE

The present disclosure provides a method for decoding a video signal including a current block based on an affine motion prediction mode (affine mode, AF mode), the method including: checking whether the AF mode is applied to the current block, the AF mode representing a motion prediction mode using an affine motion model; checking whether an AF4 mode is used when the AF mode is applied to the current block, the AF4 mode representing a mode in which a motion vector is predicted using four parameters constituting the affine motion model; generating a motion vector predictor using the four parameters when the AF4 mode is used and generating a motion vector predictor using six parameters constituting the affine motion model when the AF4 mode is not used; and obtaining a motion vector of the current block based on the motion vector predictor.

In the present disclosure, the method may further include obtaining an affine flag from the video signal, wherein the affine flag indicates whether the AF mode is applied to the current block, and whether the AF mode is applied to the current block is checked based on the affine flag.

In the present disclosure, the method may further include obtaining an affine parameter flag from the video signal when the AF mode is applied to the current block according to the affine flag, wherein the affine parameter flag indicates whether the motion vector predictor is generated using the four parameters or the six parameters.

In the present disclosure, the affine flag and the affine parameter flag may be defined at at least one level of a slice, a largest coding unit, a coding unit and a prediction unit.

In the present disclosure, the method may further include checking whether the size of the current block satisfies a predetermined condition, wherein the predetermined condition represents whether at least one of the number of pixels in the current block and width and/or the height of the current block is greater than a predetermined threshold value, and the checking of whether the AF mode is applied to the current block is performed when the size of the current block satisfies the predetermined condition.

In the present disclosure, the current block may be decoded based on a coding mode other than the AF mode when the size of the current block does not satisfy the predetermined condition.

In the present disclosure, the method may further include checking whether the AF mode has been applied to a neighbor block when the AF mode is applied to the current block, wherein the motion vector predictor is generated using the four parameters when the AF mode has been applied to the neighbor block, and the checking of whether the AF4 mode is used is performed when the AF mode has not been applied to the neighbor block.

The present disclosure provides an apparatus for decoding a video signal including a current block based on an affine motion prediction mode (AF mode), the apparatus including an inter prediction unit configured to: check whether the AF mode is applied to the current block; check whether an AF4 mode is used when the AF mode is applied to the current block; generate a motion vector predictor using four parameters when the AF4 mode is used and generate a motion vector predictor using six parameters constituting an affine motion model when the AF4 mode is not used; and obtain a motion vector of the current block based on the motion vector predictor, wherein the AF mode represents a motion prediction mode using the affine motion model, and the AF4 mode represents a mode in which a motion vector is predicted using four parameters constituting the affine motion model.

In the present disclosure, the apparatus may further include a parser configured to parse an affine flag from the video signal, wherein the affine flag indicates whether the AF mode is applied to the current block, and whether the AF mode is applied to the current block is checked based on the affine flag.

In the present disclosure, the apparatus may include the parser configured to obtain an affine parameter flag from the video signal when the AF mode is applied to the current block according to the affine flag, wherein the affine parameter flag indicates whether the motion vector predictor is generated using the four parameters or the six parameters.

In the present disclosure, the apparatus may include the inter prediction unit configured to check whether the size of the current block satisfies a predetermined condition, wherein the predetermined condition represents whether at least one of the number of pixels in the current block and width and/or the height of the current block is greater than a predetermined threshold value, and the checking of whether the AF mode is applied to the current block is performed when the size of the current block satisfies the predetermined condition.

In the present disclosure, the apparatus may include the inter prediction unit configured to check whether the AF mode has been applied to a neighbor block when the AF mode is applied to the current block, wherein the motion vector predictor is generated using the four parameters when the AF mode has been applied to the neighbor block, and the checking of whether the AF4 mode is used is performed when the AF mode has not been applied to the neighbor block.

DETAILED DESCRIPTION

Hereinafter, a configuration and operation of an embodiment of the present disclosure will be described in detail with reference to the accompanying drawings, a configuration and operation of the present disclosure described with reference to the drawings are described as an embodiment, and the scope, a core configuration, and operation of the present disclosure are not limited thereto.

Further, terms used in the present disclosure are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present disclosure and a meaning of the corresponding term should be comprehended and construed.

Further, when there is a general term selected for describing the disclosure or another term having a similar meaning, terms used in the present disclosure may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present disclosure.

Referring to FIG. 1, an encoder 100 may include an image segmentation unit 110, a transform unit 120, a quantization unit 130, a dequantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU). Here, segmentation may be performed by at least one of QT (QuadTree), BT (Binary Tree), TT (Ternary Tree) and AT (Asymmetric Tree).

However, the terms are used only for convenience of illustration of the present disclosure, the present disclosure is not limited to the definitions of the terms. In this specification, for convenience of illustration, the term "coding unit" is employed as a unit used in a process of encoding or decoding a video signal, however, the present disclosure is not limited thereto, another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bit streams.

The quantized signal output from the quantization unit 130 may be used to generate a prediction signal. For example, the quantized signal may be subjected to a dequantization and an inverse transform via the dequantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

Meanwhile, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and dequantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter is applied to a reconstructed picture, and thus can improve the precision of a prediction. For example, the inter prediction unit 180 may generate an interpolated pixel by applying the interpolation filter to an integer pixel, and may perform a prediction using an interpolated block configured with interpolated pixels as a prediction block.

The intra prediction unit 185 may predict a current block with reference to samples peripheral to a block to be now encoded. The intra prediction unit 185 may perform the following process in order to perform intra prediction. First, the prediction unit may prepare a reference sample necessary to generate a prediction signal. Furthermore, the prediction unit may generate a prediction signal using the prepared reference sample. Thereafter, the prediction unit encodes a prediction mode. In this case, the reference sample may be prepared through reference sample padding and/or reference sample filtering. The reference sample may include a quantization error because a prediction and reconstruction process has been performed on the reference sample. Accordingly, in order to reduce such an error, a reference sample filtering process may be performed on each prediction mode used for intra prediction.

The prediction signal generated through the inter prediction unit 180 or the intra prediction unit 185 may be used to generate a reconstructed signal or may be used to generate a residual signal.

FIG. 2 is an embodiment to which the present disclosure is applied and shows a schematic block diagram of a decoder by which the decoding of a video signal is performed.

Referring to FIG. 2, the decoder 200 may be configured to include a parsing unit (not shown), an entropy decoding unit 210, a dequantization unit 220, an inverse transform unit 230, a filtering unit 240, a decoded picture buffer (DPB) unit 250, an inter prediction unit 260, an intra prediction unit 265 and a reconstruction unit (not shown).

The decoder 200 may receive a signal output by the encoder 100 of FIG. 1, and may parse or obtain a syntax element through the parsing unit (not shown). The parsed or obtained signal may be entropy-decoded through the entropy decoding unit 210.

The dequantization unit 220 obtains a transform coefficient from the entropy-decoded signal using quantization step size information.

The inverse transform unit 230 obtains a residual signal by inversely transforming the transform coefficient.

The reconstruction unit (not shown) generates a reconstructed signal by adding the obtained residual signal to a prediction signal output by the inter prediction unit 260 or the intra prediction unit 265.

The filtering unit 240 applies filtering to the reconstructed signal and transmits the filtered signal to a playback device or transmits the filtered signal to the decoded picture buffer unit 250. The filtered signal transmitted to the decoded picture buffer unit 250 may be used as a reference picture in the inter prediction unit 260.

In this specification, the embodiments described in the filtering unit 160, inter prediction unit 180 and intra prediction unit 185 of the encoder 100 may be identically applied to the filtering unit 240, inter prediction unit 260 and intra prediction unit 265 of the decoder, respectively.

A reconstructed video signal output through the decoder 200 may be played back through a playback device.

FIG. 3 is a diagram for explaining a QT (QuadTree, referred to as 'QT' hereinafter) block segmentation structure as an embodiment to which the present disclosure is applicable.

In video coding, a single block can be segmented based on QT (QuadTree). Further, a single subblock segmented according to QT can be further recursively segmented using QT. A leaf block that is QT segmented no longer can be segmented according to at least one of BT (Binary Tree), TT (Ternary Tree) and AT (Asymmetric Tree). BT can have two types of segmentation: horizontal BT (2N×N, 2N×N); and vertical BT (N×2N, N×2N). TT can have two types of segmentation: horizontal TT (2N×1/2N, 2N×N, 2N×1/2N); and vertical TT (1/2N×2N, N×2N, 1/2N×2N). AT can have four types of segmentation: horizontal-up AT (2N×1/2N, 2N×3/2N); horizontal-down AT (2N×3/2N, 2N×1/2N); vertical-left AT (1/2N×2N, 3/2N×2N); and vertical-right AT (3/2N×2N, 1/2N×2N). BT, TT and AT may be further recursively segmented using BT, TT and AT.

FIG. 3 shows an example of QT segmentation. A block A can be segmented into four subblocks A0, A1, A2 and A3 using QT. The subblock A1 can be further segmented into four subblocks B0, B1, B2 and B3 using QT.

FIG. 4 is a diagram for explaining a BT (Binary Tree, referred to as 'BT' hereinafter) block segmentation structure as an embodiment to which the present disclosure is applicable.

FIG. 4 shows an example of BT segmentation. A block B3 that is segmented no longer by QT can be segmented into vertical BT C0 and C1 or horizontal BT D0 and D1. Each subblock such as the block C0 can be further recursively segmented into horizontal BT E0 and E1 or vertical BT F0 and F1.

FIG. 5 is a diagram for explaining a TT (Ternary Tree, referred to as 'TT' hereinafter) block segmentation structure as an embodiment to which the present disclosure is applicable.

FIG. 5 shows an example of TT segmentation. A block B3 that is segmented no longer by QT can be segmented into vertical TT C0, C1 and C2 or horizontal TT D0, D1 and D2. Each subblock such as the block C1 can be further recursively segmented into horizontal TT E0, E1 and E2 or vertical TT F0, F1 and F2.

FIG. 6 is a diagram for explaining an AT (Asymmetric Tree, referred to as 'AT' hereinafter) block segmentation structure as an embodiment to which the present disclosure is applicable.

FIG. 6 shows an example of AT segmentation. A block B3 that is segmented no longer by QT can be segmented into vertical AT C0 and C1 or horizontal AT D0 and D1. Each subblock such as the block C1 can be further recursively segmented into horizontal AT E0 and E1 or vertical AT F0 and F1.

Meanwhile, BT, TT and AT segmentations can be used together. For example, a subblock segmented by BT can be segmented by TT or AT. Further, a subblock segmented by TT can be segmented by BT or AT. A subblock segmented by AT can be segmented by BT or TT. For example, each subblock may be segmented into vertical BT after horizontal BT segmentation and each subblock may be segmented into horizontal BT after vertical BT segmentation. These two segmentation methods have different segmentation orders but finally segmented shapes obtained thereby are identical.

In addition, when a block is segmented, a block search order can be defined in various manners. In general, search is performed from left to right and from top to bottom, and block search may mean the order of determining additional block segmentation of each segmented subblock, encoding order of each subblock when the block is segmented no longer, or search order when a subblock refers to information on other neighbor blocks.

FIGS. 7A and 7B are diagram for explaining an inter-prediction mode as an embodiment to which the present disclosure is applied.

Inter-Prediction Mode

In an inter-prediction mode to which the present disclosure is applied, a merge mode, an AMVP (Advanced Motion Vector Prediction) mode of an affine prediction mode (hereinafter referred to as 'AF mode') may be used in order to reduce the quantity of motion information.

1) Merge Mode

The merge mode refers to a method of deriving motion parameters (or information) from a spatially or temporally neighbor block.

A set of candidates available in the merge mode includes spatial neighbor candidates, temporal candidates and generated candidates.

Referring to FIG. 7A, whether each spatial candidate block is available in the order of {A1, B1, B0, A0, B2}. Here, when a candidate block is encoded in an intra-prediction mode and thus there is no motion information or the candidate block is located outside a current picture (or slice), the candidate block cannot be used.

After determination of validity of spatial candidates, spatial merge candidates can be configured by excluding unnecessary candidate blocks from candidate blocks of a current processing block. For example, when a candidate block of a current predictive block is the first predictive block in the same coding block, the candidate block can be excluded and candidate blocks having the same motion information can be excluded.

When spatial merge candidate configuration is completed, a temporal merge candidate configuration process is performed in the order of {T0, T1}.

In temporal candidate configuration, if a right bottom block T0 of a collocated block of a reference picture is available, the corresponding block is configured as a temporal merge candidate. The collocated block refers to a block present at a position in the selected reference picture, which corresponds to a current processing block. If not, a block T1 located at the center of the collocated block is configured as a temporal merge candidate.

A maximum number of merge candidates may be specified in a slice header. If the number of merge candidates is greater than the maximum number, smaller numbers of spatial candidates and temporal candidate than the maximum number are maintained. If not, candidates added so far are combined to generate additional merge candidates (i.e., combined bi-predictive merging candidates) until the number of merge candidates reaches the maximum number.

An encoder configures a merge candidate list through the above method and performs motion estimation to signal information on a candidate block selected from the merge candidate list to a decoder as a merge index (e.g., merge_idx [x0][y0]'). FIG. 7B illustrates a case in which a block B1 is selected from the merge candidate list. In this case, "index 1" can be signaled to the decoder as a merge index.

The decoder configures a merge candidate list as in the encoder and derives motion information on a current block from motion information of a candidate block corresponding to the merge index received from the encoder in the merge candidate list. In addition, the decoder generates a predictive block with respect to a current processing block based on the derived motion information.

2) AMVP (Advanced Motion Prediction) Mode

The AMVP mode refers to a method of deriving a motion vector prediction value from a neighbor block. Accordingly, horizontal and vertical motion vector differences (MVDs), a reference index and an inter-prediction mode are signaled to a decoder. Horizontal and vertical motion vector values are calculated using a derived motion vector prediction value and a motion vector difference (MVD) provided by an encoder.

That is, the encoder configures a motion vector prediction value candidate list and performs motion estimation to signal a motion reference flag (i.e., candidate block information) (e.g., mvp_lX_flag[x0][y0]') selected from the motion vector prediction value candidate list to the decoder. The decoder configures a motion vector prediction value candidate list as in the encoder and derives a motion vector prediction value of a current processing block using motion information of a candidate block indicated by the motion reference flag received from the encoder in the motion vector prediction value candidate list. In addition, the decoder obtains a motion vector value of the current processing block using the derived motion vector prediction value and the motion vector difference transmitted from the encoder. Then, the decoder generates a predictive block with respect to the current processing block based on derived motion information (i.e., motion compensation).

In the case of the AMVP mode, two spatial motion candidates are selected from five available candidates in FIGS. 7A and 7B. The first spatial motion candidate is selected from a left set {A0, A1} and the second spatial motion candidate is selected from a top set {B0, B1, B2}. Here, motion vectors are scaled when a reference index of a neighbor candidate block is not the same as that of a current predictive block.

If the number of candidates selected as a spatial motion candidate search result is 2, candidate configuration is ended. If the number is less than 2, temporal motion candidates are added.

The decoder (e.g., an inter-prediction unit) decodes motion parameters with respect to a processing block (e.g., a prediction unit).

For example, when the processing block uses the merge mode, the decoder can decode a merge index signaled from the encoder. Then, the decoder can derive motion parameters of the current processing block from motion parameters of a candidate block indicated by the merge index.

Furthermore, when the AMVP mode is applied to the processing block, the decoder can decode horizontal and vertical motion vector differences (MVDs), a reference index and an inter-prediction mode signaled from the encoder. In addition, the decoder can derive a motion vector prediction value from motion parameters of a candidate block indicated by a motion reference flag and derive a motion vector value of the current processing block using the motion vector prediction value and the received motion vector differences.

The decoder performs motion compensation with respect to a prediction unit using decoded motion parameters (or information).

That is, the encoder/decoder performs motion compensation for predicting an image of a current unit from a previously decoded picture using decoded motion parameters.

3) AF Mode (Affine Mode)

The AF mode refers to a motion prediction mode using an affine motion model and may include at least one of an affine merge mode and an affine inter mode. The affine inter mode may include at least one of an AF4 mode and an AF6 mode. Here, the AF4 mode represents a four parameter affine prediction mode using four parameters and the AF6 mode represents a six parameter affine prediction mode using six parameters.

Although the ARF4 mode or the AF6 mode is represented in the present disclosure for convenience, the AF4 mode and the AF6 mode need not be defined as separate prediction modes and can be distinguished from each other according to whether four parameters are used or six parameters are used.

The AF modes will be described in detail with reference to FIGS. 8 to 10.

FIG. 8 is a diagram for explaining an affine motion model as an embodiment to which the present disclosure is applied.

General image coding techniques use a translation motion model to represent a motion of a coding block. Here, the translation motion model represents a prediction method based on a translated block. That is, motion information of a coding block is represented using a single motion vector. However, pixels may have different optimal motion vectors in an actual coding block. If an optimal motion vector can be determined per pixel or subblock using a small amount of information, coding efficiency can be improved.

Accordingly, the present disclosure proposes an inter-prediction based image processing method reflecting various motions of an image as well as a prediction method based on a translated block in order to improve inter-prediction performance.

In addition, the present disclosure proposes an affine motion prediction method for performing encoding/decoding using an affine motion model. The affine motion model represents a prediction method of deriving a motion vector in units of pixel or subblock using a control point motion vector. In the description, an affine motion prediction mode using the affine motion model is referred to as an AF mode (affine mode).

Furthermore, the present disclosure provides a method for adaptively performing affine prediction based on a block size.

Furthermore, the present disclosure provides a method for adaptively performing affine prediction based on whether a neighbor block has been coded according to affine prediction.

Moreover, the present disclosure provides a method for adaptively determining (or selecting) an optimal coding mode based on at least one of the AF4 mode and the AF6 mode. Here, the AF4 mode represents a four parameter affine prediction mode using four parameters and the AF6 mode represents a six parameter affine prediction mode using six parameters.

Referring to FIG. 8, various methods can be used to represent distortion of an image as motion information, and particularly, the affine motion model can represent four motions illustrated in FIG. 8.

For example, the affine motion model can model any image distortion including translation of an image, scaling of an image, rotation of an image and shearing of an image.

Although the affine motion model can be represented through various methods, the present disclosure proposes a method for displaying (or identifying) distortion using motion information at a specific reference point (or reference pixel/sample) of a block and performing inter-prediction using the same. Here, a reference point may be referred to as a control point (CP) (or a control pixel or a control sample) and a motion vector at the reference point may be referred to as a control point motion vector (CPMV). A degree of distortion that can be represented may depend on the number of control points.

The affine motion model can be represented using six parameters a, b, c, d, e and f as represented by Equation 1 below.

$$\begin{cases} v_x = a*x + b*y + c \\ v_y = d*x + e*y + f \end{cases} \quad \text{[Equation 1]}$$

Here, (x,y) represents the position of a left top pixel of a coding block. In addition, v_x and v_y represent motion vectors at (x,y).

FIGS. 9A and 9B are diagrams for explaining an affine motion prediction method using a control point motion vector as an embodiment to which the present disclosure is applied.

Referring to FIG. 9A, a left top control point $CP_0$ 902 (hereinafter referred to as a first control point), a right top control point $CP_1$ 903 (hereinafter referred to as a second control point), and a left bottom control point $CP_2$ 904 (hereinafter referred to as a third control point) of a current block 901 may have independent pieces of motion information. These can be represented as $CP_0$, $CP_1$ and $CP_2$. However, this corresponds to an embodiment of the present disclosure and the present disclosure is not limited thereto. For example, control points may be defined in various manners as a right bottom control point, a center control point and other control points for positions of subblocks.

In an embodiment of the present disclosure, at least one of the first to third control points may be a pixel included in the current block. Alternatively, at least one of the first to third control points may be a pixel that is not included in the current block and neighbors the current block.

Motion information per pixel or subblock of the current block 901 can be derived using motion information of one or more of the aforementioned control points.

For example, an affine motion model using motion vectors of the left top control point 902, the right top control point 903 and the left bottom control point 904 of the current block 901 can be defined as represented by Equation 2 below.

$$\begin{cases} v_x = \frac{(v_{1x} - v_{0x})}{w} * x + \frac{(v_{2x} - v_{0x})}{h} * x + v_{0x} \\ v_y = \frac{(v_{1y} - v_{0y})}{w} * x - \frac{(v_{2y} - v_{0y})}{h} * y + v_{0y} \end{cases} \quad \text{[Equation 2]}$$

Here, when $\vec{v_0}$ represents the motion vector of the left top control point, $\vec{v_1}$ represents the motion vector of the right top control point 903, and $\vec{v_2}$ represents the motion vector of the left bottom control point 904, these motion vectors can be defined as $\vec{v_0}=\{v_{0x},v_{0y}\}$, $\vec{v_1}=\{v_{1x},v_{1y}\}$ and $\vec{v_2}=\{v_{2x},v_{2y}\}$. Further, in Equation 2, w represents the width of the current block 901 and h represent the height of the current block 901. In addition, $\vec{v}=\{v_x,v_y\}$ represents motion vectors at $\{x,y\}$.

The present disclosure can define an affine motion model that represents three motions of translation, scale and rotation from among motions that can be represented by affine motion models. This is referred to as a simplified affine motion model or a similarity affine motion model in the description.

The simplified affine motion model can be represented using four parameters a, b, c and d as represented by Equation 3 below.

$$\begin{cases} v_x = a*x - b*y + c \\ v_y = b*x + a*y + d \end{cases} \quad \text{[Equation 3]}$$

Here, $\{v_x,v_y\}$ represents motion vectors at $\{x,y\}$. The affine motion model using the four parameters may be referred to as AF4. The present disclosure is not limited thereto, a case in which six parameters are used is referred to as AF6 and the above-described embodiments can be equally applied thereto.

Referring to FIG. 9B, when $\vec{v_0}$ represents a motion vector of a left top control point 1001 of a current block and $\vec{v_1}$ represents a motion vector of a right top control point 1002, these motion vectors can be defined as $\vec{v_0}=\{v_{0x},v_{0y}\}$ and $\vec{v_1}=\{v_{1x},v_{1y}\}$. Here, the affine motion model of AF4 may be defined as represented by Equation 4 below.

$$\begin{cases} v_x = \frac{(v_{1x} - v_{0x})}{w} * x - \frac{(v_{1y} - v_{0y})}{w} * y + v_{0x} \\ v_y = \frac{(v_{1y} - v_{0y})}{w} * x - \frac{(v_{1x} - v_{0x})}{w} * y + v_{0y} \end{cases} \quad \text{[Equation 4]}$$

In Equation 4, w represents the width of the current block and h represents the height of the current block. In addition, $\vec{v}=\{v_x,v_y\}$ represents motion vectors at $\{x,y\}$.

An encoder or a decoder can determine (or derive) a motion vector of each pixel position using control point motion vectors (e.g., the motion vectors of the left top control point 1001 and the right top control point 1002).

In the present disclosure, a set of motion vectors determined through affine motion prediction can be defined as an affine motion vector field. The affine motion vector field can be determined using at least one of Equations 1 to 4.

In an encoding/decoding process, a motion vector through affine motion prediction can be determined in units of pixel or predetermined (or preset) block (or subblock). For example, a motion vector can be derived based on each pixel in a block when a motion vector is determined in units of pixel, and a motion vector can be derived based on each subblock in a current block when a motion vector is determined in units of subblock. Alternatively, when a motion vector is determined in units of subblock, a motion vector of a corresponding subblock can be derived based on the left top pixel or the center pixel.

Hereinafter, although a case in which a motion vector through affine motion prediction is determined in units of 4×4 blocks will be chiefly described in present disclosure for convenience of description, the present disclosure is not limited thereto and the present disclosure may be applied in units of pixel or in units of block having a different size.

Meanwhile, referring to FIG. 9B, a case in which the size of the current block is 16×16 is assumed. The encoder or decoder can determine motion vectors in units of 4×4 subblocks using motion vectors of the left top control point 1001 and the right top control point 1002 of the current block. In addition, a motion vector of a subblock can be determined based on the center pixel value of the subblock.

In FIG. 9B, an arrow indicated at the center of each subblock represents a motion vector obtained by the affine motion model.

Affine motion prediction can be used in an affine merge mode (hereinafter referred to as an 'AF merge mode') and an affine inter mode (hereinafter referred to as an 'AF inter mode'). The AF merge mode is a method of deriving two control point motion vectors and encoding or decoding the same without decoding a motion vector difference similarly to the skip mode or the merge mode. The AF inter mode is a method of determining a motion vector predictor and a control point motion vector and then encoding or decoding a control point motion vector difference (CPMVD) corresponding to a difference between the motion vector predictor and the control point motion vector. In this case, two control point motion vector differences are transmitted in the case of the AF4 mode and three control point motion vector differences are transmitted in the case of the AF6 mode.

Here, the AF4 mode has the advantage that it can represents a control point motion vector (CPMV) using a small number of bits because the AF4 mode transmits a smaller number of motion vector differences than that of the AF6 mode, whereas the AF6 mode has the advantage that it can reduce the number of bits for residual coding because the AF6 mode transmits three CPMVDs and thus can generate an excellent predictor.

Therefore, the present disclosure proposes a method of considering both the AF4 mode and the AF6 mode (or simultaneously) in the AF inter mode.

FIG. 10 is a flowchart illustrating a process of processing a video signal including a current block using an affine prediction mode (hereinafter referred to as an 'AF mode') as an embodiment to which the present disclosure is applied.

The present disclosure provides a method for processing a video signal including a current block using the AF mode.

First, a video signal processing apparatus may generate a candidate list of motion vector pairs using motion vectors of pixels or blocks neighboring at least two control points of the current block (S1010). Here, the control points may refer to corner pixels of the current block and the motion vector pairs may include motion vectors of a left top corner pixel and a right top corner pixel of the current block.

In an embodiment, the control points may include at least two of the left top corner pixel, the right top corner pixel, the left bottom corner pixel and the right bottom corner pixel, and the candidate list may include pixels or blocks neighboring the left top corner pixel, the right top corner pixel and the left bottom corner pixel.

In an embodiment, the candidate list may be generated based on motion vectors of a diagonal neighbor pixel A, an upper neighbor pixel B and a left neighbor pixel C of the left top corner pixels, motion vectors of an upper neighbor pixel D and a diagonal neighbor pixel E of the right top corner pixel, and motion vectors of a left neighbor pixel F and a diagonal neighbor pixel G of the left bottom corner pixel.

In an embodiment, the aforementioned method may further include a step of adding an AMVP candidate list to the candidate list when the number of motion vector pairs included in the candidate list is less than 2.

In an embodiment, a control point motion vector of the current block may be determined as a motion vector derived based on the centers of a left subblock and a right subblock in the current block when the current block has a size of N×4, and the control point motion vector of the current block may be determined as a motion vector derived based on the centers of a top subblock and a bottom subblock in the current block when the current block has a size of 4×N.

In an embodiment, a control point motion vector of the left subblock in the current block is determined by the average of a first control point motion vector and a third control point motion vector and a control point motion vector of the right subblock is determined by the average of a second control point motion vector and a fourth control point motion vector when the current block has a size of N×4, whereas a control point motion vector of the top subblock in the current block is determined by the average of the first control point motion vector and the second control point motion vector and a control point motion vector of the bottom subblock is determined by the average of the third control point motion vector and the fourth control point motion vector when the current block has a size of 4×N.

In another embodiment, the aforementioned method may signal a prediction mode or flag information indicating whether the AF mode is executed.

In this case, the video signal processing apparatus may receive the prediction mode or the flag information, execute the AF mode according to the prediction mode or the flag information and derive a motion vector according to the AF mode. Here, the AF mode represents a mode of deriving a motion vector in units of pixel or subblock using control point motion vectors of the current block.

Meanwhile, the video signal processing apparatus may determine a final candidate list of a predetermined number of motion vector pairs based on divergence values of the motion vector pairs (S1020). Here, the final candidate list is determined in ascending order of divergence values, and a divergence value refers to a value indicating similarity of directions of motion vectors.

The video signal processing apparatus may determine a control point motion vector of the current block based on a rate-distortion cost from the final candidate list (S1030).

The video signal processing apparatus may generate a motion vector predictor of the current block based on the control point motion vector (S1040).

FIG. 11 is a flowchart illustrating a process of adaptively determining an optimal coding mode based on at least one of the AF4 mode and the AF6 mode as an embodiment (1-1) to which the present disclosure is applied.

The video signal processing apparatus may perform prediction based on at least one of a skip mode, a merge mode and an inter mode (S1110). Here, the merge mode may include the aforementioned AF merge mode as well as the normal merge mode and the inter mode may include the aforementioned AF inter mode as well as the normal inter mode.

The video signal processing apparatus may perform motion vector prediction based on at least one of the AF4 mode and the AF6 mode (S1120). Here, step S1110 and step S1120 are not limited to the order thereof.

The video signal processing apparatus may determine an optimal coding mode from among the aforementioned modes by comparing results of step S1120 (S1130). Here, the results of step S1120 may be compared based on rate-distortion cost.

Then, the video signal processing apparatus may generate a motion vector predictor of the current block based on the optimal coding mode and obtain a motion vector difference by subtracting the motion vector predictor from the motion vector of the current block.

Thereafter, the encoding/decoding processes described in FIGS. 1 and 2 may be equally applied.

FIG. 12 is a flowchart illustrating a process of adaptively performing decoding based on the AF4 mode or the AF6 mode as an embodiment (1-2) to which the present disclosure is applied.

A decoder may receive a bitstream (S1210). The bitstream may include information about a coding mode of a current block in a video signal.

The decoder may check whether the coding mode of the current block is an AF mode (S1220). Here, the AF mode refers to an affine motion prediction mode using an affine motion model and may include at least one of the affine merge mode and the affine inter mode, for example, and the affine inter mode may include at least one of the AF4 mode and the AF6 mode.

Here, step S1220 may be checked by an affine flag indicating whether the AF mode is executed. For example, the affine flag may be represented by affine_flag. When affine_flag=1, this represents the AF mode is executed on the current block. When affine_flag=0, this represents that the AF mode is not executed on the current block.

When the AF mode is not executed on the current block, the decoder may perform decoding (i.e., motion vector prediction) according to a coding mode other than the AF mode (S1230). For example, the skip mode, the merge mode or the inter mode may be used.

When the AF mode is executed on the current block, the decoder may check whether the AF4 mode is applied to the current block (S1240).

Here, step S1240 may be checked by an affine parameter flag indicating whether the AF4 mode is executed (or whether affine motion prediction is performed using four parameters). For example, the affine parameter flag may be represented by affine_param_flag. When affine_param_flag=0, this represents that motion vector prediction is performed according to the AF4 mode (S1250). When affine_param_flag=1, this represents that motion vector prediction is performed according to the AF6 mode (S1260). However, the present disclosure is not limited thereto.

For example, the affine parameter flag may include at least one of AF4_flag and AF6_flag.

AF4_flag indicates whether the AF4 mode is executed on the current block. The AF4 mode is executed on the current block when AF4_flag=1 and the AF4 mode is not executed on the current block when AF4_flag=0. Here, execution of the AF4 mode means execution of motion vector prediction using an affine motion model represented by four parameters.

AF6_flag indicates whether the AF6 mode is executed on the current block. The AF6 mode is executed on the current block when AF6_flag=1 and the AF6 mode is not executed on the current block when AF6_flag=0. Here, execution of the AF6 mode means execution of motion vector prediction using an affine motion model represented by four parameters.

The affine flag and the affine parameter flag may be defined at at least one level of a slice, a largest coding unit, a coding unit and a prediction unit.

For example, at least one of AF_flag, AF4_flag and AF6_flag may be defined at the slice level and additionally defined at the block level or prediction unit level.

FIG. 13 illustrates a syntax structure in which decoding is performed based on the AF4 mode or the AF6 mode as an embodiment (1-3) to which the present disclosure is applied.

A decoder may obtain merge_flag and check whether the merge mode is applied to the current block (S1310).

When the merge mode is not applied to the current block, the decoder may obtain affine_flag (S1320). Here, affine_flag indicates whether the AF mode is executed.

When affine_flag=1, that is, when the AF mode is executed on the current block, the decoder may obtain affine_param_flag (S1330). Here, affine_param_flag indicates whether the AF4 mode is executed (or whether affine motion prediction is executed using four parameters).

When affine_param_flag=0, that is, when motion vector prediction is executed according to the AF4 mode, the decoder may obtain two motion vector differences of mvd_CP0 and mvd_CP1 (S1340). Here, mvd_CP0 indicates a motion vector difference with respect to control point 0 and mvd_CP1 indicates a motion vector difference with respect to control point 1.

When affine_param_flag=1, that is, when motion vector prediction is executed according to the AF6 mode, the decoder may obtain three motion vector differences of mvd_CP0, mvd_CP1 and mvd_CP2 (S1350).

FIG. 14 is a flowchart illustrating a process of adaptively determining an optimal coding mode from among motion vector prediction modes including the AF4 mode or the AF6 mode based on condition A as an embodiment (2-1) to which present disclosure is applied.

An encoder may execute prediction based on at least one of the skip mode, the merge mode and the inter mode (S1410).

The encoder may check whether condition A is satisfied for the current block in order to determine an optimal coding mode for motion vector prediction (S1420).

Here, condition A may refer to a condition with respect to a block size. For example, embodiments of Table 1 below may be applied.

TABLE 1

|  | CONDITION A | TH1 value |
| --- | --- | --- |
| Example 1 | pixNum (= width * height) > TH1 | TH1 = 64, 128, 256, 512, 1024, . . . |
| Example 2 | width > TH1 && height > TH1 | TH1 = 4, 8, 16, 32, . . . |
| Example 3 | width > TH1 \|\| height > TH1 | TH1 = 4, 8, 16, 32, . . . |

In Example 1 of Table 1, condition A represents whether the number of pixels pixNum of the current block is greater than a threshold value TH1. Here, the threshold value may be 64, 128, 256, 512, 1024, . . . . For example, TH1=64 represents that a block size is 4×16, 8×8 or 16×4 and TH1=128 represents that a block size is 32×4, 16×8, 8×16 or 4×32.

Example 2 represents whether both the width and height of the current block are greater than the threshold value TH1.

Example 3 represents whether the width of the current block is greater than the threshold value TH1 or whether the height of the current block is greater than the threshold value TH1.

When condition A is satisfied, the encoder may perform motion vector prediction based on at least one of the AF4 mode and the AF6 mode (S1430).

The encoder may determine an optimal coding mode from among motion vector prediction modes including the AF4 mode or the AF6 mode by comparing results of steps S1410 and S1430 (S1440).

On the other hand, when condition A is not satisfied, the encoder may determine an optimal coding mode from among modes other than the AF mode (S1440).

Then, the encoder may generate a motion vector predictor of the current block based on the optimal coding mode and obtain a motion vector difference by subtracting the motion vector predictor from the motion vector of the current block.

Thereafter, the encoding/decoding processes described in FIGS. 1 and 2 may be equally applied.

FIG. 15 is a flowchart illustrating a process of adaptively performing decoding according to the AF4 mode or the AF6 mode based on condition A as an embodiment (2-2) to which the present disclosure is applied.

A decoder may receive a bitstream (S1510). The bitstream may include information about a coding mode of a current block in a video signal.

The decoder may check whether condition A is satisfied for the current block in order to determine an optimal coding mode for motion vector prediction (S1520). Here, condition A may refer to a condition with respect to a block size. For example, embodiments of Table 1 above may be applied.

When condition A is satisfied, the decoder may check whether the coding mode of the current block is the AF mode (S1530). Here, the AF mode refers to an affine motion prediction mode using an affine motion model and the embodiments described in the description may be applied.

Here, step S1530 may be checked by an affine flag indicating whether the AF mode is executed. For example, the affine flag may be represented by affine_flag. When affine_flag=1, this represents that the AF mode is executed on the current block. When affine_flag=0, this represents that the AF mode is not executed on the current block.

When condition A is not satisfied or the AF mode is not executed on the current block, the decoder may perform decoding (i.e., motion vector prediction) according to a coding mode other than the AF mode (S1540). For example, the skip mode, the merge mode or the inter mode may be used.

When the AF mode is executed on the current block, the decoder may check whether the AF4 mode is applied to the current block (S1550).

Here, step S1550 may be checked by an affine parameter flag indicating whether the AF4 mode is executed (or whether affine motion prediction is executed using four parameters). For example, the affine parameter flag may be represented by affine_param_flag. When affine_param_flag=0, this represents that motion vector prediction is performed according to the AF4 mode (S1560). When affine_param_flag=1, this represents that motion vector prediction is performed according to the AF6 mode (S1570). However, the present disclosure is not limited thereto.

FIG. 16 illustrates a syntax structure in which decoding is performed according to the AF4 mode or the AF6 mode based on condition A as an embodiment (2-3) to which the present disclosure is applied.

A decoder may obtain merge_flag and check whether the merge mode is applied to the current block (S1610).

When the merge mode is not applied to the current block, the decoder may check whether condition A is satisfied (S1620). Here, condition A may refer to a condition with respect to a block size. For example, the embodiments of Table 1 may be applied.

When condition A is satisfied, the decoder may obtain affine_flag (S1620). Here, affine_flag indicates whether the AF mode is executed.

When affine_flag=1, that is, when the AF mode is executed on the current block, the decoder may obtain affine_param_flag (S1630). Here, affine_param_flag indicates whether the AF4 mode is executed (or whether affine motion prediction is executed using four parameters).

When affine_param_flag=0, that is, when motion vector prediction is executed according to the AF4 mode, the decoder may obtain two motion vector differences of mvd_CP0 and mvd_CP1 (S1640). Here, mvd_CP0 indicates a motion vector difference with respect to control point 0 and mvd_CP1 indicates a motion vector difference with respect to control point 1.

In addition, when affine_param_flag=1, that is, when motion vector prediction is executed according to the AF6 mode, the decoder may obtain three motion vector differences of mvd_CP0, mvd_CP1 and mvd_CP2 (S1650).

FIG. 17 is a flowchart illustrating a process of adaptively determining an optimal coding mode from among motion vector prediction modes including the AF4 mode or the AF6 mode as an embodiment (3-1) to which the present disclosure is applied.

The present disclosure provides a method for adaptively selecting the AF4 mode and the AF6 mode based on the size of the current block.

For example, one more motion vector difference is additionally transmitted in the AF6 mode than in the AF4 mode, and thus the AF6 mode is effective for a relatively large block. Accordingly, encoding can be performed in consideration of only the AF4 mode when the size of the current block is less than (or equal to or less than) a predetermined size and encoding can be performed in consideration of only the AF6 mode when the size of the current block is equal to or greater than (or greater than) the predetermined size.

Meanwhile, in the case of a domain in which it is not determined that only one of the AF4 mode and the AF6 mode is clearly advantageous, both the AF4 mode and the AF6 mode are considered and only an optimal mode therebetween can be signaled.

Referring to FIG. 17, an encoder may execute prediction based on at least one of the skip mode, the merge mode and the inter mode (S1710).

The encoder may check whether condition B is satisfied for the current block (S1720). Here, condition B may refer to a condition with respect to a block size. For example, embodiments of Table 2 below may be applied.

TABLE 2

| | CONDITION B | TH2 value |
| --- | --- | --- |
| Example 1 | pixNum (= width * height) < TH2 | TH2 = 64, 128, 256, 512, 1024, . . . |
| Example 2 | width < TH2 && height < TH2 | TH2 = 4, 8, 16, 32, . . . |
| Example 3 | width < TH2 ∥ height < TH2 | TH2 = 4, 8, 16, 32, . . . |

In Example 1 of Table 2, condition B represents whether the number of pixels pixNum of the current block is less than a threshold value TH2. Here, the threshold value may be 64, 128, 256, 512, 1024, . . . . For example, TH2=64 may represent that a block size is 4×16, 8×8 or 16×4 and TH2=128 may represent that a block size is 32×4, 16×8, 8×16 or 4×32.

Example 2 represents whether both the width and height of the current block are less than the threshold value TH2.

Example 3 represents whether the width of the current block is less than the threshold value TH2 or whether the height of the current block is less than the threshold value TH2.

When condition B is satisfied, the encoder may perform motion vector prediction based on the AF4 mode (S1730).

When condition B is not satisfied, the encoder may check whether condition C is satisfied for the current block (S1740). Here, condition C may refer to a condition with respect to a block size. For example, embodiments of Table 3 below may be applied.

TABLE 3

| | CONDITION C | TH3 value |
|---|---|---|
| Example 1 | pixNum (= width * height) ≥ TH3 | TH3 = 64, 128, 256, 512, 1024, . . . |
| Example 2 | width ≥ TH3 && height ≥ TH3 | TH3 = 4, 8, 16, 32, . . . |
| Example 3 | width ≥ TH3 ‖ height ≥ TH3 | TH3 = 4, 8, 16, 32, . . . |

In Example 1 of Table 3, condition A represents whether the number of pixels pixNum of the current block is equal to or greater than a threshold value TH3. Here, the threshold value may be 64, 128, 256, 512, 1024, . . . . For example, TH3=64 may represent that a block size is 4×16, 8×8 or 16×4 and TH3=128 may represent that a block size is 32×4, 16×8, 8×16 or 4×32.

Example 2 represents whether both the width and height of the current block are equal to or greater than the threshold value TH3.

Example 3 represents whether the width of the current block is equal to or greater than the threshold value TH1 or whether the height of the current block is equal to or greater than the threshold value TH1.

When condition C is satisfied, the encoder may perform motion vector prediction based on the AF6 mode (S1760).

When condition C is not satisfied, the encoder may perform motion vector prediction based on the AF4 mode and the AF6 mode (S1750).

Meanwhile, in condition B and condition C, the threshold values TH2 and TH3 may be determined such that they satisfy Equation 5 below.

$$TH\_2 \le TH\_3$$ [Equation 5]

The encoder may determine an optimal coding mode from among motion vector prediction modes including the AF4 mode or the AF6 mode by comparing results of steps S1710, S1730, S1750 and S1760 (S1770).

Then, the encoder may generate a motion vector predictor of the current block based on the optimal coding mode and obtain a motion vector difference by subtracting the motion vector predictor from the motion vector of the current block.

Thereafter, the encoding/decoding processes described in FIGS. 1 and 2 may be equally applied.

FIG. 18 is a flowchart illustrating a process of adaptively performing decoding according to the AF4 mode or the AF6 mode based on at least one of condition B and condition C as an embodiment (3-2) to which the present disclosure is applied.

A decoder may check whether a coding mode of the current block is the AF mode (S1810). Here, the AF mode refers to an affine motion prediction mode using an affine motion model, embodiments described in the description may be applied, and redundant description is omitted.

When the AF mode is executed on the current block, the decoder may check whether condition B is satisfied for the current block (S1820). Here, condition B may refer to a condition with respect to a block size. For example, the embodiments of Table 2 may be applied and redundant description is omitted.

When condition B is satisfied, the decoder may perform motion vector prediction based on the AF4 mode (S1830).

When condition B is not satisfied, the decoder may check whether condition C is satisfied for the current block (S1840). Here, condition C may refer to a condition with respect to a block size. For example, the embodiments of Table 3 may be applied and redundant description is omitted.

Meanwhile, in condition B and condition C, the threshold values TH2 and TH3 may be determined such that they satisfy Equation 5.

When condition C is satisfied, the decoder may perform motion vector prediction based on the AF6 mode (S1860).

When condition C is not satisfied, the decoder may check whether the AF4 mode is applied to the current block (S1850).

Here, step S1850 may be checked by an affine parameter flag indicating whether the AF4 mode is executed (or whether affine motion prediction is performed using four parameters).

For example, the affine parameter flag may be represented by affine_param_flag. When affine_param_flag=0, this may represent that motion vector prediction is performed according to the AF4 mode (S1830). When affine_param_flag=1, this may represent that motion vector prediction is performed according to the AF6 mode (S1860). However, the present disclosure is not limited thereto.

Meanwhile, when the AF mode is not executed on the current block, the decoder may perform decoding (i.e., motion vector prediction) according to a coding mode other than the AF mode (S1870). For example, the skip mode, the merge mode or the inter mode may be used.

FIG. 19 illustrates a syntax structure in which decoding is performed according to the AF4 mode or the AF6 mode based on at least one of condition B and condition C as an embodiment (3-3) to which the present disclosure is applied.

A decoder may obtain merge_flag and check whether the merge mode is applied to the current block (S1910).

When the merge mode is not applied to the current block, the decoder may obtain affine_flag (S1920). Here, affine_flag indicates whether the AF mode is executed.

When affine_flag=1, that is, when the AF mode is executed on the current block, the decoder may check whether condition B is satisfied (S1620). Here, condition B may refer to a condition with respect to a block size. For example, the embodiments of Table 2 may be applied.

When condition B is satisfied, the decoder may set affine_param_flag to 0 (S1930). Here, affine_param_flag indicates whether the AF4 mode is executed (or whether affine motion prediction is executed using four parameters). affine_param_flag=0 represents that motion vector prediction is performed according to the AF4 mode.

When condition B is not satisfied and condition C is satisfied, the decoder may set affine_param_flag to 1 (S1940). Here, affine_param_flag=1 represents that motion vector prediction is performed according to the AF6 mode.

When both condition B and condition C are not satisfied, the decoder may obtain affine_param_flag (S1950).

When affine_param_flag=0, the decoder may obtain two motion vector differences of mvd_CP0 and mvd_CP1 (S1960).

When affine_param_flag=1, the decoder may obtain three motion vector differences of mvd_CP0, mvd_CP1 and mvd_CP2 (S1970).

FIG. 20 is a flowchart illustrating a process of adaptively determining an optimal coding mode from among motion vector prediction modes including the AF4 mode or the AF6 mode based on a coding mode of a neighbor block as an embodiment (4-1) to which the present disclosure is applied.

An encoder may perform prediction based on at least one of the skip mode, the merge mode and the inter mode (S2010).

The encoder may check whether a neighbor block has been coded in the AF mode (S2020). Here, whether the neighbor block has been coded in the AF mode may be represented by isNeighborAffine( ) For example, when isNeighborAffine( )=0, this can indicate that the neighbor block has not been coded in the AF mode. When isNeighborAffine( )=1, this can indicate that the neighbor block has been coded in the AF mode.

When the neighbor block has not been coded in the AF mode, the encoder may perform motion vector prediction based on the AF4 mode (S2030).

When the neighbor block has been coded in the AF mode, the encoder may perform motion vector prediction based on the AF4 mode and also perform motion vector prediction based on the AF6 mode (S2040).

The encoder may determine an optimal coding mode from among motion vector prediction modes including the AF4 mode or the AF6 mode by comparing results of steps S2030 and S2040 (S2050).

Then, the encoder may generate a motion vector predictor of the current block based on the optimal coding mode and obtain a motion vector difference by subtracting the motion vector predictor from the motion vector of the current block.

Thereafter, the encoding/decoding processes described in FIGS. 1 and 2 may be equally applied.

FIG. 21 is a flowchart illustrating a process of adaptively performing decoding according to the AF4 mode or the AF6 mode based on a coding mode of a neighbor block as an embodiment (4-2) to which the present disclosure is applied.

A decoder may receive a bitstream (S2110). The bitstream may include information about a coding mode of a current block in a video signal.

The decoder may check whether a coding mode of the current block is the AF mode (S2120).

When the AF mode is not executed on the current block, the decoder may perform decoding (i.e., motion vector prediction) according to a coding mode other than the AF mode (S2170). For example, the skip mode, the merge mode or the inter mode may be used.

When the AF mode is executed on the current block, the decoder may check whether the neighbor block has been coded in the AF mode (S2130). Here, whether the neighbor block has been coded in the AF mode may be represented by isNeighborAffine( ). For example, when isNeighborAffine( )=0, this can indicate that the neighbor block has not been coded in the AF mode. When isNeighborAffine( )=1, this can indicate that the neighbor block has been coded in the AF mode.

When the neighbor block has been coded in the AF mode, the decoder may perform motion vector prediction based on the AF4 mode (S2140).

When the neighbor block has not been coded in the AF mode, the decoder may check whether the AF4 mode is applied to the current block (S2150).

Here, step S2150 may be checked by an affine parameter flag indicating whether the AF4 mode is executed (or whether affine motion prediction is executed using four parameters). For example, the affine parameter flag may be represented by affine_param_flag. When affine_param_flag=0, motion vector prediction is performed according to the AF4 mode (S2140). When affine_param_flag=1, motion vector prediction is performed according to the AF6 mode (S2160).

FIG. 22 illustrates a syntax structure in which decoding is performed according to the AF4 mode or the AF6 mode based on a coding mode of a neighbor block as an embodiment (4-3) to which the present disclosure is applied.

A decoder may obtain merge_flag and check whether the merge mode is applied to the current block (S2210).

When the merge mode is not applied to the current block, the decoder may obtain affine_flag (S2220). Here, affine_flag indicates whether the AF mode is executed.

When affine_flag=1, that is, when the AF mode is executed on the current block, the decoder may check whether the neighbor block has been coded in the AF mode (S2230).

When the neighbor block has been coded in the AF mode, the decoder may obtain affine_param_flag (S2230). Here, affine_param_flag indicates whether the AF4 mode is executed (or whether affine motion prediction is executed using four parameters).

When the neighbor block has not been coded in the AF mode, the decoder may set affine_param_flag to 0 (S2240).

When affine_param_flag=0, that is, when motion vector prediction is performed according to the AF4 mode, the decoder may obtain two motion vector differences of mvd_CP0 and mvd_CP1 (S2250).

When affine_param_flag=1, that is, when motion vector prediction is performed according to the AF6 mode, the decoder may obtain three motion vector differences of mvd_CP0, mvd_CP1 and mvd_CP2 (S2260).

FIG. 23 is a flowchart illustrating a process of adaptively determining an optimal coding mode from among motion vector prediction modes including the AF4 mode or the AF6 mode based on at least one of condition A, condition B and condition C as an embodiment (5-1) to which the present disclosure is applied.

The present disclosure provide an embodiment that is a combination of the second embodiment and the third embodiment. FIG. 23 illustrates an example in which all conditions A, B and C are considered, and the conditions may be applied in different orders.

Referring to FIG. 23, an encoder may perform prediction based on at least one of the skip mode, the merge mode and the inter mode (S2310).

The encoder may check whether condition A is satisfied for the current block (S2320). Here, condition A may refer to a condition with respect to a block size and the embodiments of Table 1 above may be applied thereto.

When condition A is satisfied, the encoder may determine an optimal coding mode from among modes other than the AF mode (S2330).

On the other hand, when condition A is not satisfied, the encoder may check whether condition B is satisfied for the current block (S2330). Here, condition B may refer to a condition with respect to a block size and the embodiments of Table 2 above may be applied thereto.

When condition B is satisfied, the encoder may perform motion vector prediction based on the AF4 mode (S2340).

When condition B is not satisfied, the encoder may check whether condition C is satisfied for the current block (S2350). Here, condition C may refer to a condition with respect to a block size and the embodiments of Table 3 may be applied thereto.

When condition C is satisfied, the encoder may perform motion vector prediction based on the AF6 mode (S2370).

When condition C is not satisfied, the encoder may perform motion vector prediction based on the AF4 mode and perform motion vector prediction based on the AF6 mode (S2360).

Meanwhile, in condition B and condition C, the threshold values TH2 and TH3 may be determined such that they satisfy Equation 5.

The encoder may determine an optimal coding mode by comparing results of steps S2310, S2340, S2360 and S2370 (2380).

Then, the encoder may generate a motion vector predictor of the current block based on the optimal coding mode and obtain a motion vector difference by subtracting the motion vector predictor from the motion vector of the current block.

Thereafter, the encoding/decoding processes described in FIGS. 1 and 2 may be equally applied.

FIG. 24 is a flowchart illustrating a process of adaptively performing decoding according to the AF4 mode or the AF6 mode based on at least one of condition A, condition B and condition C as an embodiment (5-2) to which the present disclosure is applied.

A decoder may check whether condition A is satisfied for the current block (S2410). Here, condition A may refer to a condition with respect to a block size. For example, the embodiments of Table 1 above may be applied thereto.

When condition A is satisfied, the decoder may check whether a coding mode of the current block is the AF mode (S2420). Here, the AF mode refers to an affine motion prediction mode using an affine motion model, embodiments described in the description may be applied, and redundant description is omitted.

When condition A is not satisfied or the AF mode is not executed on the current block, the decoder may perform decoding (i.e., motion vector prediction) according to a coding mode other than the AF mode (S2480). For example, the skip mode, the merge mode or the inter mode may be used.

When the AF mode is executed on the current block, the decoder check whether condition B is satisfied for the current block (S2430). Here, condition B may refer to a condition with respect to a block size. For example, the embodiments of Table 2 may be applied thereto and redundant description is omitted.

When condition B is satisfied, the decoder may perform motion vector prediction based on the AF4 mode (S2440).

When condition B is not satisfied, the decoder may check whether condition C is satisfied for the current block (S2450). Here, condition C may refer to a condition with respect to a block size. For example, the embodiments of Table 3 may be applied thereto and redundant description is omitted.

Meanwhile, in condition B and condition C, the threshold values TH2 and TH3 may be determined such that they satisfy Equation 5.

When condition C is satisfied, the decoder may perform motion vector prediction based on the AF6 mode (S2470).

When condition C is not satisfied, the decoder may check whether the AF4 mode is applied to the current block (S2460).

Here, step S2460 may be checked by an affine parameter flag indicating whether the AF4 mode is executed (or whether affine motion prediction is performed using four parameters).

For example, the affine parameter flag may be represented by affine_param_flag. When affine_param_flag=0, this may represent that motion vector prediction is performed according to the AF4 mode (S2440). When affine_param_flag=1, this may represent that motion vector prediction is performed according to the AF6 mode (S2470). However, the present disclosure is not limited thereto.

FIG. 25 illustrates a syntax structure in which decoding is performed according to the AF4 mode or the AF6 mode based on at least one of condition A, condition B and condition C as an embodiment (5-3) to which the present disclosure is applied.

A decoder may obtain merge_flag and check whether the merge mode is applied to the current block (S2510).

When the merge mode is not applied to the current block, the decoder may check whether condition A is satisfied (S2520). Here, condition A may refer to a condition with respect to a block size. For example, the embodiments of Table 1 above may be applied thereto.

When condition A is satisfied, the decoder may obtain affine_flag (S2520). Here, affine_flag indicates whether the AF mode is executed.

When affine_flag=1, that is, when the AF mode is executed on the current block, the decoder may check whether condition B is satisfied (S2530). Here, condition B may refer to a condition with respect to a block size. For example, the embodiments of Table 2 may be applied thereto.

When condition B is satisfied, the decoder may set affine_param_flag to 0 (S2540). Here, affine_param_flag indicates whether the AF4 mode is executed (or whether affine motion prediction is executed using four parameters). affine_param_flag=0 represents that motion vector prediction is performed according to the AF4 mode.

When condition B is not satisfied and condition C is satisfied, the decoder may set affine_param_flag to 1 (S2550). Here, affine_param_flag=1 represents that motion vector prediction is performed according to the AF6 mode.

When both condition B and condition C are not satisfied, the decoder may obtain affine_param_flag (S2560).

When affine_param_flag=0, the decoder may obtain two motion vector differences of mvd_CP0 and mvd_CP1 (S2570).

When affine_param_flag=1, the decoder may obtain three motion vector differences of mvd_CP0, mvd_CP1 and mvd_CP2 (S2580).

FIG. 26 is a flowchart illustrating a process of adaptively determining an optimal coding mode from among motion vector prediction modes including the AF4 mode or the AF6 mode based on at least one of condition A and a coding mode of the neighbor block as an embodiment (6-1) to which the present disclosure is applied.

An encoder may perform prediction based on at least one of the skip mode, the merge mode and the inter mode (S2610).

The encoder may check whether condition A is satisfied for the current block (S2620). Here, condition A may refer to a condition with respect to a block size and the embodiments of Table 1 above may be applied thereto.

When condition A is satisfied, the encoder may determine an optimal coding mode from among modes other than the AF mode (S2660).

On the other hand, when condition A is not satisfied, the encoder may check whether a neighbor block has been coded in the AF mode (S2630). Here, whether the neighbor block has been coded in the AF mode may be represented by isNeighborAffine( ). For example, when isNeighborAffine( )=0, this can indicate that the neighbor block has not been coded in the AF mode. When isNeighborAffine( )=1, this can indicate that the neighbor block has been coded in the AF mode.

When the neighbor block has not been coded in the AF mode, the encoder may perform motion vector prediction based on the AF4 mode (S2640).

When the neighbor block has been coded in the AF mode, the encoder may perform motion vector prediction based on the AF4 mode and also perform motion vector prediction based on the AF6 mode (S2650).

The encoder may determine an optimal coding mode by comparing results of steps S2610, S2640 and S2650 (S2660).

Then, the encoder may generate a motion vector predictor of the current block based on the optimal coding mode and obtain a motion vector difference by subtracting the motion vector predictor from the motion vector of the current block.

Thereafter, the encoding/decoding processes described in FIGS. 1 and 2 may be equally applied.

FIG. 27 is a flowchart illustrating a process of adaptively performing decoding according to the AF4 mode or the AF6 mode based on at least one of condition A and a coding mode of a neighbor block as an embodiment (6-2) to which the present disclosure is applied.

A decoder may receive a bitstream (S2710). The bitstream may include information about a coding mode of a current block in a video signal.

The decoder may check whether condition A is satisfied for the current block in order to determine an optimal coding mode for motion vector prediction (S2720). Here, condition A may refer to a condition with respect to a block size. For example, the embodiments of Table 1 above may be applied thereto.

When condition A is satisfied, the decoder may check whether the coding mode of the current block is the AF mode (S2730).

Details described in S2120 to S2170 of FIG. 21 can be applied to the following steps S2730 to S2780 and redundant description is omitted.

FIG. 28 illustrates a syntax structure in which decoding is performed according to the AF4 mode or the AF6 mode based on at least one of condition A and a coding mode of a neighbor block as an embodiment (6-3) to which the present disclosure is applied.

A decoder may obtain merge_flag and check whether the merge mode is applied to the current block (S2810).

When the merge mode is not applied to the current block, the decoder may check whether condition A is satisfied (S2820). Here, condition A may refer to a condition with respect to a block size. For example, the embodiments of Table 1 above may be applied thereto.

When condition A is satisfied, the decoder may obtain affine_flag (S2820). Here, affine_flag indicates whether the AF mode is executed.

Details described in S2230 to S2260 of FIG. 22 can be applied to the following steps S2830 to S2860 and redundant description is omitted.

FIG. 29 is a flowchart illustrating a process of generating a motion vector predictor based on at least one of the AF4 mode and the AF6 mode as an embodiment to which the present disclosure is applied.

A decoder may check whether an AF mode is applied to the current block (S2910). Here, the AF mode represents a motion prediction mode using an affine motion model.

For example, the decoder may acquire an affine flag from a video signal and check whether the AF mode is applied to the current block based on the affine flag.

When the AF mode is applied to the current block, the decoder may check whether the AF4 mode is used (S2920).

Here, the AF4 mode represents a mode in which a motion vector is predicted using four parameters constituting the affine motion model.

For example, when the affine flag indicates that the AF mode is applied to the current block, the decoder may obtain an affine parameter flag from the video signal, and the affine parameter flag indicates whether the motion vector predictor is generated using the four parameters or six parameters.

Here, the affine flag and the affine parameter flag may be defined at at least one level of a slice, a largest coding unit, a coding unit and a prediction unit.

The decoder may generate the motion vector predictor using the four parameters when the AF4 mode is used and generate the motion vector predictor using six parameters constituting the affine motion model when the AF4 mode is not used (S2930).

The decoder may obtain a motion vector of the current block based on the motion vector predictor (S2940).

In an embodiment, the decoder may check whether the size of the current block satisfies a predetermined condition. Here, the predetermined condition represents whether at least one of the number of pixels in the current block, the width and/or the height of the current block is greater than a predetermined threshold value.

For example, when the size of the current block satisfies the predetermined condition, the decoder may check whether the AF mode is applied to the current block.

On the other hand, when the size of the current block does not satisfy the predetermined condition, the current block may be decoded based on a coding mode other than the AF mode.

In an embodiment, the decoder may check whether the AF mode has been applied to a neighbor block when the AF mode is applied to the current block.

The motion vector predictor is generated using the four parameters when the AF mode has been applied to the neighbor block, and the decoder may perform the step of checking whether the AF4 mode is used when the AF mode has not been applied to the neighbor block.

FIG. 30 is a flowchart illustrating a process of generating a motion vector predictor based on AF4_flag and AF6_flag as an embodiment to which the present disclosure is applied.

A decoder may obtain at least one of AF4 flag and AF6 flag from a video signal (S3010). Here, AF4_flag indicates whether the AF4 mode is executed on the current block and AF6_flag indicates whether the AF6 mode is executed on the current block.

Here, at least one of AF4_flag and AF6_flag may be defined at a slice level and additionally defined at a block level or a prediction unit level. However, the present disclosure is not limited thereto, and at least one of AF4_flag and AF6_flag may be defined at at least one level of a slice, a largest coding unit, a coding unit and a prediction unit.

The decoder may check values of AF4_flag and AF6_flag (S3020).

The AF4 mode is executed on the current block when AF4_flag=1 and the AF4 mode is not executed on the current block when AF4_flag=0. Here, execution of the AF4 mode means execution of motion vector prediction using an affine motion model represented by four parameters.

The AF6 mode is executed on the current block when AF6_flag=1 and the AF6 mode is not executed on the current block when AF6_flag=0. Here, execution of the AF6 mode means execution of motion vector prediction using an affine motion model represented by four parameters.

When AF4_flag=0 and AF6_flag=0, the decoder may perform motion vector prediction according to a mode other than the AF4 mode and the AF6 mode (S3030).

When AF4_flag=1 and AF6_flag=0, the decoder may perform motion vector prediction according to the AF4 mode (S3040).

When AF4_flag=0 and AF6_flag=0, the decoder may perform motion vector prediction according to the AF6 mode (S3050).

When AF4_flag=1 and AF6_flag=1, the decoder may perform motion vector prediction according to the AF4 mode or the AF6 mode (S3060).

FIG. 31 is a flowchart illustrating a process of adaptively performing decoding according to the AF4 mode or the AF6 mode based on whether a neighbor block has been coded in an AF mode as an embodiment to which the present disclosure is applied.

A decoder may check whether the AF mode is applied to the current block (S3110).

The decoder may check whether a neighbor block has been coded in the AF mode when the AF mode is applied to the current block (S3120).

The decoder may obtain at least one of AF4_flag and AF6_flag when the neighbor block has been coded in the AF mode (S3130).

The decoder may generate a motion vector predictor using four parameters or six parameters based on at least one of AF4_flag and AF6_flag (S3140). For example, the decoder may perform motion vector prediction according to the AF4 mode when AF4_flag=1 and may perform motion vector prediction according to the AF6 mode when AF6_flag=1.

The decoder may obtain a motion vector of the current block based on the motion vector predictor (S3150).

FIG. 32 illustrates a syntax in which decoding is adaptively performed based on AF4_flag and AF6_flag as an embodiment to which the present disclosure is applied.

A decoder may obtain AF4_flag and AF6_flag at a slice level (S3010). Here, AF4_flag indicates whether the AF4 mode is executed on the current block and AF6_flag indicates whether the AF6 mode is executed on the current block. AF4_flag may be represented by affine_4_flag and AF6_flag may be represented by affine_6_flag.

The decoder may adaptively perform decoding based on AF4_flag and AF6_flag at a block level or a prediction unit level.

When affine_4_flag is not 0 or affine_6_flag is not 0 (that is, in cases other than affine_4_flag=0 && affine_6_flag=0), the decoder may obtain an affine flag (S3220). The affine flag can indicate whether the AF mode is executed.

When the AF mode is executed, the decoder may adaptively perform decoding according to the values of AF4_flag and AF6_flag.

When affine_4_flag=1 && affine_6_flag=0, the decoder may set affine_param_flag to 0. That is, affine_param_flag=0 represents that the AF4 mode is executed.

When affine_4_flag=0 && affine_6_flag=1, the decoder may set affine_param_flag to 1. That is, affine_param_flag=1 represents that the AF6 mode is executed.

When affine_4_flag=1 && affine_6_flag=1, the decoder may parse or obtain affine_param_flag. Here, the decoder may perform decoding in the AF4 mode or the AF6 mode according to the value of affine_param_flag at a block level or a prediction unit level.

The above-described embodiments may be applied to other syntax structures and redundant description is omitted.

FIG. 33 illustrates a syntax in which decoding is adaptively performed according to the AF4 mode or the AF6 mode based on whether a neighbor block has been coded in an AF mode as an embodiment to which the present disclosure is applied.

In the present embodiment, the above description can be applied to redundant parts in FIGS. 32 and 33 and only different parts are described.

When affine_4_flag=1 && affine_6_flag=1, the decoder may check whether a neighbor block has been coded in the AF mode.

When the neighbor block has been coded in the AF mode, the decoder may parse or obtain affine_param_flag (S3310). Here, the decoder may perform decoding in the AF4 mode or the AF6 mode according to the value of affine_param_flag at a block level or a prediction unit level.

On the other hand, when the neighbor block has not been coded in the AF mode, the decoder may set affine_param_flag to 0. That is, affine_param_flag=0 represents that the AF4 mode is executed.

FIG. 34 illustrates a video coding system to which the present disclosure is applied.

The video coding system may include a source device and a receiving device. The source device may transmit encoded video/image information or data in a file or streaming format to the receiving device through a digital storage medium or a network.

The source device may include a video source, an encoding apparatus, and a transmitter. The receiving device may include a receiver, a decoding apparatus, and a renderer. The encoding apparatus may be called a video/image encoding apparatus and the decoding apparatus may be called a video/image decoding apparatus. The transmitter may be included in the encoding apparatus. The receiver may be included in the decoding apparatus. The renderer may include a display and the display may be configured in the form of a separate device or an external component.

The video source may obtain a video/image through video/image capture, combination, generation, or the like. The video source may include a video/image capture device and/or a video/image generation device. The video/image capture device may include one or more cameras, a video/image archive including previously captured video/images, and the like, for example. The video/image generation device may include a computer, a tablet, a smartphone, and the like, for example, and (electronically) generate a video/image. For example, a virtual video/image can be generated through a computer or the like, and in this case, a process of generating related data may be replaced by a video/image capture process.

The encoding apparatus can encode a video/image. The encoding apparatus can perform a series of procedures such as prediction, transformation and quantization for compression and coding efficiency. Encoded data (encoded video/image information) may be output in the form of a bitstream.

The transmitter may transmit encoded video/image information or data output in the form of a bitstream to the receiver of the receiving device in a file or streaming format through a digital storage medium or a network. The digital storage medium may include various storage media such as a USB, an SD, a CD, a DVD, Blueray, an HDD, and an SSD. The transmitter may include an element for generating a media file through a predetermined file format and an element for transmission through a broadcast/communication network. The receiver may extract the bitstream and transmit the bitstream to the decoding apparatus.

The decoding apparatus can decode a video/image by performing a series of procedures such as dequantization, inverse transformation and prediction corresponding to operation of the encoding apparatus.

The renderer can render the decoded video/image. The rendered video/image may be displayed through a display.

FIG. 35 illustrates a content streaming system to which the present disclosure is applied.

Referring to FIG. 35, the content streaming system to which the present disclosure is applied may include an encoding server, a streaming server, a web server, a media storage, a user equipment, and multimedia input devices.

The encoding server serves to compress content input from multimedia input devices such as a smartphone, a camera and a camcorder into digital content to generate bitstreams and transmit the bitstreams to the streaming server. As another example, when the multimedia input devices such as a smartphone, a camera and a camcorder directly generate bitstreams, the encoding server may be omitted.

The bitstreams may be generated through an encoding method or a bitstream generation method to which the present disclosure is applied, and the streaming server may temporarily store the bitstreams in the process of transmitting or receiving the bitstreams.

The streaming server serves to transmit multimedia data to the user equipment based on a user request through the web server, and the web server serves as a medium that informs a user of available services. When the user requests a desired service from the web server, the web server transmits the request to the streaming server and the streaming server transmits multimedia data to the user. Here, the content streaming system may include an additional control server. In this case, the control server serves to control commands/responses between devices in the content streaming system.

The streaming server may receive content from the media storage and/or the encoding server. For example, when content is received from the encoding server, the streaming server can receive the content in real time. In this case, the streaming server can store bitstreams for a predetermined time in order to provide a smooth streaming service.

Examples of the user equipment may include cellular phones, smart phones, laptop computers, digital broadcast terminals, PDA (personal digital assistants), a PMP (portable multimedia player), navigation systems, slate PCs, tablet PCs, ultrabooks, wearable devices (e.g., a smartwatch, a smart glass, and an HMD (head mounted display)), digital TV, desktop computers, digital signage, and the like.

The servers in the content streaming system may be operated as distributed servers. In this case, data received by the servers can be processed in a distributed manner.

As described above, the embodiments described in the present disclosure may be implemented and executed on a processor, microprocessor, controller or chip. For example, the function units shown in FIGS. 1, 2, 34 and 35 may be implemented and executed on a computer, processor, microprocessor, controller or chip.

Furthermore, the decoder and the encoder to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus, and may be used to process video signals and data signals Furthermore, the decoding/encoding method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present disclosure have been disclosed for illustrative purposes, and those skilled in the art may improve, change, replace, or add various other embodiments within the technical spirit and scope of the present disclosure disclosed in the attached claims.

The invention claimed is:

1. An apparatus for decoding a video signal including a current block based on an affine motion prediction mode (AF mode), comprising:
    a processor configured to
    obtain a merge flag from the video signal, wherein the merge flag represents whether motion parameters are inferred from a neighboring block,
    check whether a width and a height of the current block is equal to or larger than a predetermined value based on that the motion parameters are not inferred from the neighboring block,
    obtain an affine flag from the video signal based on that the width and the height of the current block is equal to or larger than the predetermined value, wherein the affine flag represents whether the AF mode is applied to the current block, and the AF mode represents a motion prediction mode using an affine motion model,
    obtain an affine parameter flag representing whether 4 parameters or 6 parameters are used for the affine motion model based on that the AF mode is applied to the current block,
    obtain a motion vector predictor based on the 4 parameters or the 6 parameters being used for the affine motion model,
    obtain prediction samples for the current block based on the motion vector predictor,
    obtain residual samples for the current block, and
    reconstruct the current block based on the prediction samples and the residual samples,
    wherein the affine flag and the affine parameter flag are obtained based on that the merge flag represents the motion parameters are not inferred from the neighboring block.

2. The apparatus of claim 1, wherein the affine flag and the affine parameter flag are defined in a level of a coding unit.

3. The apparatus of claim 1, wherein the current block is decoded based on a coding mode other than the AF mode based on that the width and the height of the current block is smaller than the predetermined value.

4. An apparatus for encoding a video signal including a current block based on an affine motion prediction mode (AF mode), the apparatus comprising:
a processor configured to
generate a merge flag representing whether motion parameters are inferred from a neighboring block,
check whether a width and a height of the current block is equal to or larger than a predetermined value based on that motion parameters are not inferred from the neighboring block,
generate an affine flag from the video signal based on that the width and the height of the current block is equal to or larger than the predetermined value, wherein the affine flag represents whether the AF mode is applied to the current block, and the AF mode represents a motion prediction mode using an affine motion model,
generate an affine parameter flag representing whether 4 parameters or 6 parameters are used for the affine motion model based on that the AF mode is applied to the current block,
obtain a motion vector predictor based on the 4 parameters or the 6 parameters being used for the affine motion model,
generate prediction samples for the current block based on the motion vector predictor,
generate residual samples for the current block based on the prediction samples, and
perform a transform, a quantization and entropy-encoding for the residual samples,
wherein the affine flag and the affine parameter flag are generated based on that the merge flag represents the motion parameters are not inferred from the neighboring block.

5. The apparatus of claim 4, wherein the affine flag and the affine parameter flag are defined in a level of a coding unit.

6. The apparatus of claim 4, wherein the current block is encoded based on a coding mode other than the AF mode based on that the width and the height of the current block is smaller than the predetermined value.

7. A non-transitory computer-readable storage medium storing encoded picture information generated by performing the steps of:
generating a merge flag representing whether motion parameters are inferred from a neighboring block,
checking whether a width and a height of the current block is equal to or larger than a predetermined value based on that motion parameters are not inferred from the neighboring block,
generating an affine flag from a video signal based on that the width and the height of the current block is equal to or larger than the predetermined value, wherein the affine flag represents whether an AF mode is applied to the current block, and the AF mode represents a motion prediction mode using an affine motion model,
generating an affine parameter flag representing whether 4 parameters or 6 parameters are used for the affine motion model based on that the AF mode is applied to the current block,
obtaining a motion vector predictor based on the 4 parameters or the 6 parameters being used for the affine motion model,
generating prediction samples for the current block based on the motion vector predictor,
generating residual samples for the current block based on the prediction samples, and
performing a transform, a quantization and entropy-encoding for the residual samples,
wherein the affine flag and the affine parameter flag are generated based on that the merge flag represents the motion parameters are not inferred from the neighboring block.

8. A method of transmitting a bitstream generated by performing the steps of:
generating a merge flag representing whether motion parameters are inferred from a neighboring block,
checking whether a width and a height of the current block is equal to or larger than a predetermined value based on that motion parameters are not inferred from the neighboring block,
generating an affine flag from a video signal based on that the width and the height of the current block is equal to or larger than the predetermined value, wherein the affine flag represents whether an AF mode is applied to the current block, and the AF mode represents a motion prediction mode using an affine motion model,
generating an affine parameter flag representing whether 4 parameters or 6 parameters are used for the affine motion model based on that the AF mode is applied to the current block,
obtaining a motion vector predictor based on the 4 parameters or the 6 parameters being used for the affine motion model,
generating prediction samples for the current block based on the motion vector predictor,
generating residual samples for the current block based on the prediction samples,
performing a transform, a quantization and entropy-encoding for the residual samples, and
transmitting the bitstream including the entropy-encoded residual samples,
wherein the affine flag and the affine parameter flag are generated based on that the merge flag represents the motion parameters are not inferred from the neighboring block.

* * * * *